US012570841B2

(12) United States Patent
Biswas et al.

(10) Patent No.: US 12,570,841 B2
(45) Date of Patent: Mar. 10, 2026

(54) POLYETHYLENE COMPOSITIONS

(71) Applicant: Dow Global Technologies LLC, Midland, MI (US)

(72) Inventors: Sanjib Biswas, Lake Jackson, TX (US); Rahul Sharma, Lake Jackson, TX (US); Jacquelyn A. DeGroot, Freeport, TX (US); Erica Spiekermann, Freeport, TX (US); Douglas S. Ginger, Lake Jackson, TX (US); Jian Wang, Freeport, TX (US); Mehmet Demirors, Pearland, TX (US); David T. Gillespie, Pearland, TX (US); Hien Q. Do, Lake Jackson, TX (US); Philip P. Fontaine, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 760 days.

(21) Appl. No.: 17/789,424

(22) PCT Filed: Dec. 21, 2020

(86) PCT No.: PCT/US2020/066335
§ 371 (c)(1),
(2) Date: Jun. 27, 2022

(87) PCT Pub. No.: WO2021/138103
PCT Pub. Date: Jul. 8, 2021

(65) Prior Publication Data

US 2023/0072649 A1 Mar. 9, 2023

Related U.S. Application Data

(60) Provisional application No. 62/955,723, filed on Dec. 31, 2019.

(51) Int. Cl.
*C08L 23/08* (2025.01)
*C08F 210/02* (2006.01)
*C08J 5/18* (2006.01)

(52) U.S. Cl.
CPC ............ *C08L 23/08* (2013.01); *C08F 210/02* (2013.01); *C08J 5/18* (2013.01); *C08J 2323/06* (2013.01)

(58) Field of Classification Search
CPC combination set(s) only.
See application file for complete search history.

(56) References Cited

U.S. PATENT DOCUMENTS 3,003,000 A 10/1961 Milas et al.
3,645,922 A 2/1972 Elston et al.
3,914,342 A 10/1975 Mitchell
4,076,698 A 2/1978 Anderson et al.
4,599,392 A 7/1986 McKinney et al.
5,272,236 A 12/1993 Lai et al.
5,278,272 A 1/1994 Lai et al.
5,582,923 A 12/1996 Kale et al.
5,733,155 A 3/1998 Sagawa
5,854,045 A 12/1998 Fang et al.
5,972,444 A * 10/1999 Patel ..................... B32B 27/32 428/218
6,582,828 B1 6/2003 Kaschel
8,679,602 B2 3/2014 Michie, Jr. et al.
8,835,567 B2 9/2014 Demirors et al.
9,242,431 B2 1/2016 Cruz et al.
9,321,864 B2 4/2016 van de Esschert et al.
9,505,508 B2 11/2016 Berbert
9,631,059 B2 4/2017 Demirors et al.
9,688,795 B2 6/2017 Cerk et al.
9,751,998 B2 9/2017 Klosin et al.
9,834,712 B2 12/2017 Kapur et al.
11,247,445 B2 2/2022 Shaun et al.
2002/0065370 A1 5/2002 Chikanari et al.
2004/0241483 A1 12/2004 Farley et al.
2012/0100356 A1 4/2012 Ohlsson et al.
2014/0134302 A1 5/2014 Hodge (Continued)

FOREIGN PATENT DOCUMENTS

CA 2897575 A1 7/2014
CN 102307915 A 1/2012

(Continued)

OTHER PUBLICATIONS

Indonesian Office Action dated Jan. 10, 2024, pertaining to ID Patent Application No. P00202207183, 6 pgs.
Japanese Office Action dated Nov. 26, 2024, pertaining to JP Patent Application No. 2022-538166, 12 pgs.
Chinese Office Action and Search Report dated Apr. 19, 2023, pertaining to Chinese Patent Application No. 202080094574.3 18 pages.
Argentine Office Action dated May 9, 2024, pertaining to AR Patent Application No. 20200103682, 2 pgs.
Indonesian Office Action dated May 17, 2024, pertaining to ID Patent Application No. P00202207183, 4 pgs.
Brazil Official Action dated Apr. 4, 2024, pertaining to BR Patent Application No. BR112022012900-9, 8 pgs.

(Continued)

*Primary Examiner* — Anthony J Frost
(74) *Attorney, Agent, or Firm* — Dinsmore & Shohl LLP

(57) ABSTRACT

Embodiments of a polyethylene composition are provided, which may include a first polyethylene fraction comprising at least one peak in a temperature range of from 35° C. to 70° C. in an elution profile via improved comonomer composition distribution (iCCD) analysis method, where a first polyethylene area fraction is an area in the elution profile from 35° C. to 70° C., and where the first polyethylene fraction area comprises from 25% to 65% of the total area of the elution profile; and a second polyethylene fraction comprising at least one peak in a temperature range of from 85° C. to 120° C. in the elution profile, where a second polyethylene area fraction is an area in the elution profile from 85° C. to 120° C., and where the second polyethylene fraction area comprises at least 20% of the total area of the elution profile.

12 Claims, 2 Drawing Sheets

(56) References Cited

U.S. PATENT DOCUMENTS

| | | | |
|---|---|---|---|
| 2014/0255674 A1 | 9/2014 | Tice et al. | |
| 2015/0011719 A1* | 1/2015 | Mariott | C08J 5/18 526/123.1 |
| 2015/0360450 A1 | 12/2015 | Barbaroux et al. | |
| 2016/0108185 A1 | 4/2016 | Wang et al. | |
| 2016/0194464 A1* | 7/2016 | Demirors | C08L 23/0815 525/240 |
| 2016/0229964 A1 | 8/2016 | Bellehumeur et al. | |
| 2017/0101493 A1* | 4/2017 | Fontaine | C07F 7/28 |
| 2018/0046104 A1 | 2/2018 | Fukatsu et al. | |
| 2018/0051704 A1 | 2/2018 | Kihara et al. | |
| 2018/0155474 A1 | 6/2018 | Holtcamp et al. | |
| 2018/0222149 A1* | 8/2018 | Lee | B32B 27/08 |
| 2018/0305530 A1 | 10/2018 | Wang et al. | |
| 2019/0100644 A1 | 4/2019 | Williamson et al. | |
| 2019/0225786 A1 | 7/2019 | Yang et al. | |
| 2020/0239673 A1 | 7/2020 | Ssubramaniam et al. | |

FOREIGN PATENT DOCUMENTS

| | | | |
|---|---|---|---|
| CN | 104093749 | A | 10/2014 |
| CN | 104870488 | A | 8/2015 |
| CN | 105713278 | A | 6/2016 |
| CN | 108059763 | A | 5/2018 |
| CN | 109843587 | A | 6/2019 |
| EP | 1935909 | A1 | 6/2008 |
| EP | 1961558 | A1 | 8/2008 |
| EP | 2177548 | A1 | 4/2010 |
| EP | 2348057 | A1 | 7/2011 |
| EP | 2610269 | A1 | 7/2013 |
| EP | 2752509 | A1 | 7/2014 |
| EP | 2653392 | B1 | 10/2015 |
| EP | 2864103 | B1 | 4/2016 |
| EP | 2106421 | B2 | 6/2016 |
| EP | 2449025 | B1 | 4/2017 |
| EP | 2875073 | B1 | 1/2018 |
| EP | 4084955 | B1 | 2/2024 |
| JP | 2006265386 | A | 10/2006 |
| JP | 2015074197 | A | 4/2015 |
| JP | 2016051398 | A | 4/2016 |
| JP | 2017061123 | A | 3/2017 |
| JP | 2021505751 | A | 2/2021 |
| WO | 199947601 | | 9/1999 |
| WO | 2005023912 | A2 | 3/2005 |
| WO | 2005111291 | A1 | 11/2005 |
| WO | 2007045415 | A1 | 4/2007 |
| WO | 2007095667 | A1 | 8/2007 |
| WO | 2008089978 | A1 | 7/2008 |
| WO | 2008124557 | A1 | 10/2008 |
| WO | 2010034463 | A1 | 4/2010 |
| WO | 2010047709 | A1 | 4/2010 |
| WO | 2011002868 | A2 | 1/2011 |
| WO | 2011019563 | A1 | 2/2011 |
| WO | 2011109563 | A2 | 9/2011 |
| WO | 2011147574 | A2 | 12/2011 |
| WO | 2012003042 | A1 | 1/2012 |
| WO | 2012061168 | A1 | 5/2012 |
| WO | 2013087531 | A1 | 6/2013 |
| WO | 2014051682 | A1 | 4/2014 |
| WO | 2014058639 | A1 | 4/2014 |
| WO | 2014106017 | A1 | 7/2014 |
| WO | 2015200743 | A1 | 12/2015 |
| WO | 2016025168 | A1 | 2/2016 |
| WO | 2016075164 | A1 | 5/2016 |
| WO | 2016145550 | A1 | 9/2016 |
| WO | 2017040127 | A1 | 3/2017 |
| WO | 2017097573 | A1 | 6/2017 |
| WO | 2017155609 | A1 | 9/2017 |
| WO | 2017172273 | A1 | 10/2017 |
| WO | 2018002196 | A1 | 1/2018 |
| WO | 2018045559 | A1 | 3/2018 |
| WO | 2018106480 | A1 | 6/2018 |
| WO | 2018172510 | A1 | 9/2018 |
| WO | 2019070440 | A1 | 4/2019 |
| WO | 2019133400 | A1 | 7/2019 |

OTHER PUBLICATIONS

Communication pursuant to Rules 161(1) and 162 EPC, dated Aug. 8, 2022, pertaining to European Patent Application No. 20842505.8 3 pages.

International Search Report and Written Opinion dated Oct. 8, 2020, pertaining to Int'l Appl. No. PCT/US2020/044856 filed Aug. 4, 2020, 13 pgs.

International Search Report and Written Opinion dated Oct. 15, 2020, pertaining to Int'l Appl. No. PCT/US2020/044857 filed Aug. 4, 2020, 13 pgs.

International Search Report and Written Opinion dated Oct. 12, 2020, pertaining to Int'l Appl. No. PCT/US2020/044862 filed Aug. 4, 2020, 13 pgs.

International Search Report and Written Opinion dated Oct. 13, 2020, pertaining to Int'l Appl. No. PCT/US2020/044860 filed Aug. 4, 2020, 13 pgs.

International Search Report and Written Opinion dated Oct. 8, 2020, pertaining to Int'l Appl. No. PCT/US2020/044863 filed Aug. 4, 2020, 13 pgs.

International Search Report and Written Opinion dated Oct. 14, 2020, pertaining to Int'l Appl. No. PCT/US2020/044864 filed Aug. 4, 2020, 13 pgs.

161/162 Communication dated Mar. 15, 2022, pertaining to EP Patent Application No. 20761662.4, 3 pgs.

International Preliminary Report on Patentability dated Feb. 8, 2022, pertaining to EP Patent Application No. 20761662.4, 6 pgs.

161/162 Communication dated Mar. 15, 2022, pertaining to EP Patent Application No. 20758398.0, 3 pgs.

International Preliminary Report on Patentability dated Feb. 8, 2022, pertaining to EP Patent Application No. 20758398.0, 6 pgs.

Non-Final Office Action dated Apr. 4, 2022, pertaining to U.S. Appl. No. 16/984,765, 11 pgs.

Milas et al., "Studies in Organic Peroxides XXV Preparation, Separation and Identification of Peroxides Derived from Methyl Ethyl Ketone and Hydrogen Peroxide," A., J. Am. Chem. Soc, vol. 81, pp. 5824-5826 (1959).

International Search Report and Written Opinion dated Apr. 29, 2021, pertaining to Int'l Patent Application No. PCT/US2020/066335, 9 pgs.

Karjala et al. "Detection of low levels of long-chain branching in polyolefins" Annual Technical Conference—Society of Plastics Engineers (2008), 66th 887-891.

International Search Report and Written Opinion dated Apr. 30, 2021, pertaining to Int'l Patent Application No. PCT/US2021/016809, 35 pgs.

International Search Report and Written Opinion dated May 3, 2021, pertaining to Int'l Patent Application No. PCT/US2021/016815, 13 pgs.

India Office Action dated Nov. 12, 2025, pertaining to IN Patent Application No. 2022-1703500, 6 pgs.

* cited by examiner

POLYETHYLENE COMPOSITIONS

CROSS REFERENCE TO RELATED APPLICATIONS

This application is a national stage entry of PCT/US2020/066335 filed on Dec. 21, 2020, which claims priority to U.S. Provisional Patent Application No. 62/955,723 filed on Dec. 31, 2019, the entire disclosures of which are hereby incorporated by reference.

TECHNICAL FIELD

The instant application is directed to polymer compositions and, more specifically, to polyethylene compositions and methods of producing the same.

BACKGROUND

The use of polyolefin compositions in industries such as packaging applications is generally known. A variety of conventional methods may be employed to produce such polyolefin compositions. Various polymerization techniques using different catalyst systems have been employed to produce such polyolefin compositions suitable for packaging applications. However, despite the research efforts in developing compositions suitable for, in some embodiments, packaging applications, there is still a need for improved polyethylene compositions suitable for packaging applications that may have a good balance of physical properties and processability at desired polymer composition densities.

BRIEF SUMMARY

The instant application discloses polyethylene compositions suitable for packaging applications, films, multilayer structures, and packaging articles made therefrom. In embodiments, the presently-disclosed polyethylene compositions are suitable for use as heat-sealants packaging applications.

Conventional films, for example, those that utilize a sealant layer, typically experience a tradeoff between the hot tack initiation temperature, the heat seal initiation temperature, or both, and the overall density of the film. The density of a composition can have an effect on processing characteristics of the film. For example, films that include conventional polyethylene compositions having relatively lower densities tend to provide films that exhibit lower hot tack initiation temperatures, heat seal initiation temperatures, or both, when compared to films that include compositions with relatively higher overall densities. Polyethylene compositions having relatively lower densities can also be particularly difficult to process in conventional blown film applications due to the very low melting point and tacky or sticky nature of the material Conversely, films having a relatively higher overall density often exhibit higher hot tack initiation temperatures, heat seal initiation temperatures, or both. In packaging application, lower hot tack and heat seal initiation temperature may be desirable polymer performance characteristics. Accordingly, there are needs for films with relatively higher densities that provide lower hot tack initiation temperatures, heat seal initiation temperatures, or both. The presently-disclosed polyethylene compositions may provide films with relatively high densities and relatively low hot tack initiation temperatures, heat seal initiation temperatures, or both.

As is described in detail herein, polymer compositions may be evaluated by improved comonomers composition distribution (iCCD) analysis. Embodiments of the present disclosure may meet the needs described above regarding heat seal initiation temperature, hot tack initiation temperature, and polymer density by providing polyethylene compositions that, in some embodiments, include at least three polyethylene fractions in particular temperature ranges via iCCD analysis that each include a desired percentage of the total area of the elution profile. Such polyethylene compositions may have desirable hot tack initiation temperatures, heat seal initiation temperatures, or both, while having a density of, for example, at least 0.880 g/cm$^3$. For example, the presently-disclosed polyethylene compositions may have lower hot tack initiation temperatures, heat seal initiation temperatures, or both, at relatively high densities, than conventional polymer compositions. Without being bound by theory, it is believed that at least some of the presently described polyethylene compositions may have such properties due at least in part to a particular multi-modal elution profile where a first polyethylene fraction and a second polyethylene fraction display peaks at 35° C. to 70° C. and 85° C. to 120° C., respectively, in the elution profile of an iCCD analysis.

According to one or more embodiments, a polyethylene composition suitable for packaging applications may include (a) a first polyethylene fraction comprising at least one peak in a temperature range of 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile; (b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile. The polyethylene composition may have a density of 0.880 g/cm$^3$ to 0.910 g/cm$^3$, a melt index ($I_2$) of 0.50 g/10 minutes to 6.0 g/10 minutes, and a zero shear viscosity ratio of the polyethylene composition less than 2.0.

According to one or more embodiments, a film may comprise the polyethylene composition described above or in any of the other embodiments described herein.

According to one or more embodiments, an article may comprise the polyethylene composition described above or in any of the other embodiments described herein.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
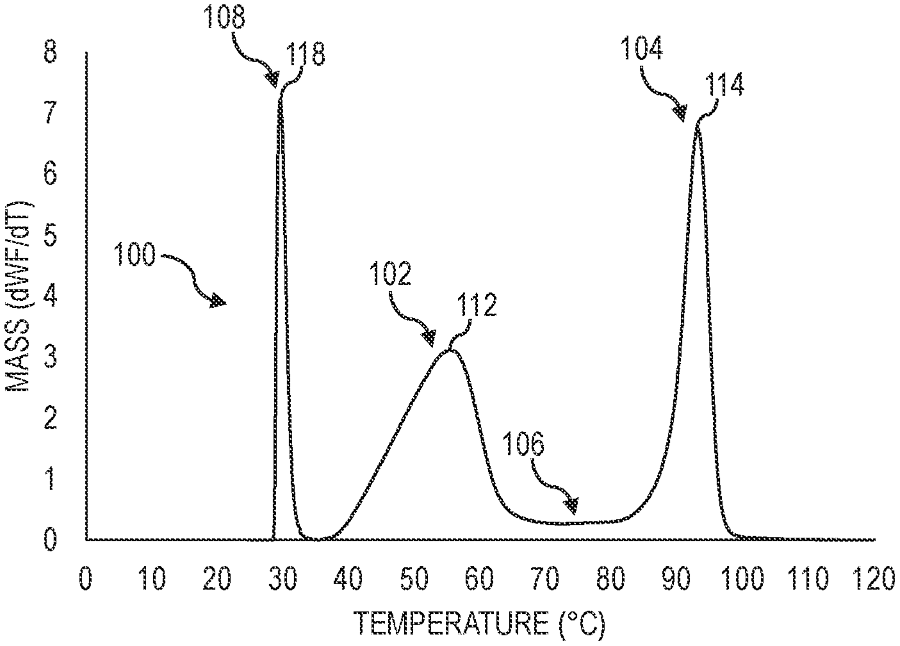
FIG. 1 schematically depicts an iCCD elution profile, according to one or more embodiments presently described.

Described herein are embodiments of polyethylene compositions. Such polyethylene compositions can be used, for example, in packaging applications. The polyethylene compositions may include a first polyethylene fraction, a second polyethylene fraction, and a third polyethylene fraction. The polyethylene composition may be included in a film (including monolayer films and multilayer films) or other articles such as multilayer structures and packages.

As described herein, a "polyethylene" or "ethylene-based polymer" refers to polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "composition," as used herein, refers to a mixture of materials which comprises the composition, as well as reaction products and decomposition products formed from the materials of the composition.

The term "LDPE" may also be referred to as "high pressure ethylene polymer" or "highly branched polyethylene" and may be defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.924 to 0.936 g/cm$^3$. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts and polyvalent aryloxyether catalysts (typically referred to as bisphenyl phenoxy).

The term "HDPE" refers to polyethylenes having densities greater than about 0.935 g/cm$^3$ and up to about 0.980 g/cm$^3$, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm$^3$, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers or plastomers generally have densities of 0.855 to 0.912 g/cm$^3$.

"Blend," "polymer blend," and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those skilled in the art.

Unless stated to the contrary, implicit from the context, or customary in the art, all parts and percent values are based on weight, all temperatures are in ° C., and all test methods are current as of the filing date of this disclosure.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term "consisting of" excludes any component, step or procedure not specifically delineated or listed.

Polyethylene Composition and Characterization

In one or more embodiments, the polyethylene composition may have a density of 0.880 g/cm$^3$ to 0.910 g/cm$^3$. For example, embodiments of the presently-disclosed polyethylene compositions may have densities of from 0.880 g/cm$^3$ to 0.908 g/cm$^3$, from 0.880 g/cm$^3$ to 0.906 g/cm$^3$, from 0.880 g/cm$^3$ to 0.904 g/cm$^3$, from 0.880 g/cm$^3$ to 0.902 g/cm$^3$, from 0.880 g/cm$^3$ to 0.900 g/cm$^3$, from 0.900 g/cm$^3$ to 0.908 g/cm$^3$, from 0.900 g/cm$^3$ to 0.906 g/cm$^3$, from 0.900 g/cm$^3$ to 0.904 g/cm$^3$, from 0.900 g/cm$^3$ to 0.902 g/cm$^3$, from 0.902 g/cm$^3$ to 0.910 g/cm$^3$, from 0.902 g/cm$^3$ to 0.908 g/cm$^3$, from 0.902 g/cm$^3$ to 0.906 g/cm$^3$, from 0.902 g/cm$^3$ to 0.904 g/cm$^3$, from 0.904 g/cm$^3$ to 0.910 g/cm$^3$, from 0.904 g/cm$^3$ to 0.908 g/cm$^3$, from 0.904 g/cm$^3$ to 0.906 g/cm$^3$, from 0.906 g/cm$^3$ to 0.910 g/cm$^3$, from 0.906 g/cm$^3$ to 0.908 g/cm$^3$, from 0.908 g/cm$^3$ to 0.910 g/cm$^3$, or any combination of these ranges.

In one or more embodiments, the polyethylene composition may have a melt index ($I_2$) of 0.50 g/10 minutes to 6.0 g/10 minutes. For example, in one or more embodiments, the polyethylene composition may have a melt index ($I_2$) of from 0.5 g/10 minutes to 5.0 g/10 minutes, from 0.5 g/10 minutes to 4.0 g/10 minutes, from 0.5 g/10 minutes to 3.0 g/10 minutes, from 0.5 g/10 minutes to 2.0 g/10 minutes, from 0.5 g/10 minutes to 1.0 g/10 minutes, from 1.0 g/10 minutes to 6.0 g/10 minutes, from 1.0 g/10 minutes to 5.0 g/10 minutes, from 1.0 g/10 minutes to 4.0 g/10 minutes, from 1.0 g/10 minutes to 3.0 g/10 minutes, from 1.0 g/10 minutes to 2.0 g/10 minutes, from 2.0 g/10 minutes to 6.0 g/10 minutes, from 2.0 g/10 minutes to 5.0 g/10 minutes, from 2.0 g/10 minutes to 4.0 g/10 minutes, from 2.0 g/10 minutes to 3.0 g/10 minutes, from 3.0 g/10 minutes to 6.0 g/10 minutes, from 3.0 g/10 minutes to 5.0 g/10 minutes, from 3.0 g/10 minutes to 4.0 g/10 minutes, from 4.0 g/10 minutes to 6.0 g/10 minutes, from 4.0 g/10 minutes to 5.0 g/10 minutes, from 5.0 g/10 minutes to 6.0 g/10 minutes, or any combination of these ranges.

According to embodiments, the polyethylene compositions may have a molecular weight distribution, expressed as the ratio of the weight average molecular weight to number average molecular weight (Mw/Mn), in the range of from 2.0 to 6.0. For example, the polyethylene composition may have a molecular weight distribution of from 2.0 to 5.5, 2.0 to 5.0, 2.0 to 4.5, 2.0 to 4.0, 2.0 to 3.5, 2.0 to 3.0, 2.0 to 2.5, 2.5 to 6.0, 3.0 to 5.5, 3.0 to 5.0, 3.0 to 4.5, 3.0 to 4.0, 3.0 to 3.5, 3.5 to 6.0, 3.5 to 5.5, 3.5 to 5.0, 3.5 to 4.5, 3.5 to 4.0, 4.0 to 6.0, 4.0 to 5.5, 4.0 to 5.0, 4.0 to 4.5, 4.5 to 6.0, 4.5 to 5.5, 4.5 to 5.0, 5.0 to 6.0, 5.0 to 5.5, or 5.5 to 6.0, or any combination of these ranges. As presently described, the molecular weight distribution may be calculated according to gel permeation chromatography (GPC) techniques as described herein.

According to one or more additional embodiments, the polyethylene composition may have a zero shear viscosity ratio of less than 2.0. For example, the polyethylene composition may have a zero shear viscosity ratio of less than 1.9, less than 1.8, less than 1.7, less than 1.6, less than 1.5, less than 1.4, less than 1.3, less than 1.2, or even less than 1.1. In one or more embodiments, the polyethylene composition may have a zero shear viscosity ratio of at least 1.0. In embodiments, the polyethylene composition may have a zero shear viscosity ratio of from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, or from 1.8 to 2.0.

Tan delta (tan δ) refers to a measure of how close a material is to a perfectly-elastic solid (where d=0°, tan delta≈0) or of how close a material is to a perfectly-Newtonian liquid (where d=90°, tan delta≈infinity). Thus, lower values of tan d reflect greater elasticity. Tan delta is a function of long chain branching (LCB) and molecular weight distribution (MWD) at the same overall molecular weight. Higher tan delta values indicate lower LCB. In embodiments, the polyethylene composition may have a tan delta at 0.1 radian/sec and 190° C., of from 10 to 100, 10 to 90, 10 to 80, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, 50 to 60, 60 to 100, 60 to 90, 60 to 80, 60 to 70, 70 to 100, 70 to 90, 70 to 80, 80 to 100, 80 to 90, or 90 to 100.

As described herein, a polyethylene "fraction" refers to a portion of the total composition of the polyethylene composition. The presently disclosed embodiments may include at least a "first polyethylene fraction" and a "second polyethylene fraction." Embodiments may include a "third polyethylene fraction" and a "fourth polyethylene fraction." The various fractions included in the polyethylene composition may be defined by their temperature range in an elution profile via improved comonomers composition distribution (iCCD) analysis method. For example, a polyethylene fraction may be defined by a range from a lower temperature to a higher temperature. It should be understood that two or more polyethylene fractions may overlap with one another. The polyethylene fractions, in one or more embodiments, may generally correlate with peaks or troughs in the iCCD data. In one or more embodiments, a particular polyethylene fraction may include a specified percentage of the total area of the polyethylene composition as defined by the iCCD analysis elution profile. Unless specified, any elution profile referred to herein is the elution profile observed via iCCD. Examples of such fractions will be better understood in view of the examples provided herewith.

In general, the first fraction may include at least one peak in the temperature range of the first fraction. The second fraction may include at least one peak in the temperature range of the second fraction. The fourth fraction may include at least one peak in the temperature range of the fourth fraction. The polyethylene compositions described herein may be referred to as "multimodal," meaning that they include at least two peaks in their elution profile. In embodiments, the polyethylene compositions described herein may include two peaks ("bimodal"), three peaks ("trimodal"), or more than three peaks in their elution profile. The first polyethylene area fraction, the second polyethylene fraction, the third polyethylene fraction, and the fourth polyethylene fraction, respectively, may each include a portion of the total mass of the polyethylene composition.

In reference to the described iCCD distribution, FIG. 1 schematically depicts a sample iCCD distribution 100. FIG. 1 depicts, generally, several features of the iCCD profiles of the presently described polyethylene compositions, such as the first fraction, the second fraction, the third fraction, the fourth fraction, etc., which are discussed in detail herein. As such, FIG. 1 can be used as a reference with respect to the disclosures related the iCCD profile provided herein.

Specifically, the first fraction 102, the second fraction 104, the third fraction 106, and the fourth fraction 108 are depicted. The first fraction 102 has a peak 112 and the second fraction 104 has a peak 114. The fourth fraction 108 may have a peak 118. It should be understood that the profile of FIG. 1 is not derived from experimentation or observation, but is instead supplied for informational purposes of describing particular features of an iCCD elution profile.

In one or more embodiments, one or more of the first polyethylene fraction, the second polyethylene fraction, and the fourth polyethylene fraction may have a single peak. As used herein, a "single peak" refers to an iCCD wherein a particular fraction include only one, singular peak. That is, in some embodiments, the iCCD of one or more of the first polyethylene fraction, the second polyethylene fraction, and the fourth polyethylene fraction includes only an upward sloping region followed by a downward sloping region to form the single peak.

It should be understood that a peak in one or more of the first polyethylene fraction, the second polyethylene fraction, and the fourth polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction 102 may be an area in the elution profile from 35° C. to 70° C. In additional embodiments, the first polyethylene fraction 102 may be an area in the elution profile in the temperature range of 35° C. to 60° C., 35° C. to 50° C., 40° C. to 70° C., 40° C. to 60° C., 40° C. to 50° C., 50° C. to 70° C., 50° C. to 60° C., 60° C. to 70° C., or any combinations in the elution profile via iCCD.

According to one or more embodiments, the first polyethylene fraction area may comprise at least 25% of the total area of the elution profile (for example, at least 30%, at least 40%, at least 50%, or even at least 60 of the total area of the elution profile). For example, the first polyethylene fraction area may comprise from 25% to 65%, 25% to 55%, 25% to 45%, 25% to 35%, 35% to 65%, 35% to 55%, 35% to 45%, 45% to 65%, 45% to 55%, 55% to 65%, or any combinations of the total area of the elution profile.

In one or more embodiments, the first polyethylene fraction 102 may have at least one peak 112 in the temperature range of 35° C. to 70° C. in the elution profile via iCCD. In one or more embodiments, the first polyethylene fraction 102 may have at least one peak 112 in the temperature range of 35° C. to 60° C., 35° C. to 50° C., 40° C. to 70° C., 40° C. to 60° C., 40° C. to 50° C., 50° C. to 70° C., 50° C. to 60° C., 60° C. to 70° C., or any combinations in the elution profile via iCCD.

The temperature range of the first polyethylene fraction of 35° C. to 70° C. may be desirable because it may correspond to a low density component of the polyethylene composition. In embodiments, the low density component may provide low the hot tack initiation temperatures, heat seal initiation temperatures, or both. Therefore, increasing the first polyethylene fraction 102, which may include the low density component, may thereby lower the hot tack initiation temperatures, heat seal initiation temperatures, or both of the polyethylene composition and improve hot tack strength and hot tack window.

In one or more embodiments, the second polyethylene fraction 104 may be an area in the elution profile from 85° C. to 120° C. In additional embodiments, the second polyethylene fraction 104 may be an area in the elution profile in the temperature range of 85° C. to 110° C., 85° C. to 100° C., 85° C. to 90° C., 90° C. to 120° C., 90° C. to 110° C., 90° C. to 100° C., 100° C. to 120° C., 100° C. to 110° C., 110° C. to 120° C., or any combinations in the elution profile via iCCD.

According to one or more embodiments, the second polyethylene fraction area may comprise at least 20% of the total area of the elution profile (for example, at least 30%, at least 35%, at least 40%, or at least 45% of the total area of the elution profile). For example, the second polyethylene fraction area may comprise from 20% to 60%, from 20% to 50%, from 20% to 40%, from 20% to 30%, from 30% to 60%, from 30% to 50%, from 30% to 40%, from 40% to 60%, from 40% to 50%, from 50% to 60%, or any combinations of the total area of the elution profile.

In one or more embodiments, the second polyethylene fraction 104 may have at least one peak 114 in the temperature range of 85° C. to 120° C. in the elution profile via iCCD. In one or more embodiments, the second polyethylene fraction 104 may have at least one peak 114 in the temperature range of 85° C. to 110° C., 85° C. to 100° C., 85° C. to 90° C., 90° C. to 120° C., 90° C. to 110° C., 90° C. to 100° C., 100° C. to 120° C., 100° C. to 110° C., 110° C. to 120° C., or any combinations in the elution profile via iCCD.

The temperature range of the second polyethylene fraction of 85° C. to 120° C. may be desirable because it may correspond to a high density component. In embodiments, increasing the high density component may increase the overall density of the polyethylene composition. Therefore, increasing the second polyethylene fraction 104 may thereby increase the high density component and provide a polyethylene composition with a higher overall density. Additionally, increasing the second polyethylene fraction 104 may improve the blocking properties of the polyethylene composition. Without being bound by theory, it is believed that larger crystals form in the high density fraction, which provide a rough surface. The rough surface may reduce the contact area, and therefore improve the blocking properties of the polyethylene composition.

In one or more embodiments, the polyethylene composition may have a local minimum in an elution profile via iCCD in a temperature range of from 65° C. to 85° C. This local minimum may fall between the peak 112 of the first polyethylene fraction 102 and the peak 114 of the second polyethylene fraction 104.

In one or more embodiments, the third polyethylene area fraction 106 may be an area in the elution profile from 70° C. to 85° C. In additional embodiments, the third polyethylene fraction 106 may be an area in the elution profile in the temperature range of from 70° C. to 80° C., 70° C. to 75° C., 75° C. to 85° C., 75° C. to 80° C., 80° C. to 85° C., or any combinations in the elution profile via iCCD.

According to one or more embodiments, the third polyethylene fraction area may comprise less than 10% of the total area of the elution profile (for example, less than 8%, less than 6%, or less than 4% of the total area of the elution profile). For example, the third polyethylene fraction area may comprise from 4% to 10%, from 4% to 8%, from 4% to 6%, from 6% to 10%, from 6% to 8%, from 8% to 10%, or any combinations of the total area of the elution profile.

In embodiments described herein, the third polyethylene area fraction 106 may be the area in the elution profile from 70° C. to 85° C. In one or more embodiments, the third polyethylene area fraction 106 may be in the area in the elution profile from 70° C. to 85° C., 70° C. to 80° C., 70° C. to 75° C., 75° C. to 85° C., 75° C. to 80° C., 80° C. to 85° C., or any combinations in the elution profile via iCCD.

It may be desirable to minimize the third polyethylene fraction 106 in the temperature range of 70° C. to 85° C., which otherwise shifts the higher density component from the second polyethylene fraction 104 towards a lower temperature range within the elution profile. Without being bound by theory, it is believed that shifting the high density component towards a lower temperature range within the elution profile may prevent the polyethylene composition from achieving the desired blocking properties.

In one or more embodiments, the fourth polyethylene area fraction 108 may be an area in the elution profile from 20° C. to 35° C. In additional embodiments, the fourth polyethylene fraction 104 may be an area in the elution profile in the temperature range of from 20° C. to 30° C., 20° C. to 25° C., 25° C. to 35° C., 25° C. to 30° C., 30° C. to 35° C., or any combinations in the elution profile via iCCD.

According to one or more embodiments, the fourth polyethylene fraction area may comprise less than 35% of the total area of the elution profile (for example, less than 30%, less than 20%, less than 10%, less than 5%, or even less than 2% of the total area of the elution profile). For example, the fourth polyethylene fraction area may comprise from 0% to 35%, from 0% to 20%, from 0% to 10%, from 0% to 5%, from 5% to 35%, from 5% to 20%, from 5% to 10%, from 10% to 35%, from 10% to 20%, from 20% to 35%, or any combinations of the total area of the elution profile.

In embodiments described herein, the fourth polyethylene area fraction 108 is the area in the elution profile beneath the at least one peak 118 of the fourth polyethylene fraction 108 from 20° C. to 35° C. In one or more embodiments, the fourth polyethylene fraction 108 may have at least one peak 118 in the temperature range of 20° C. to 30° C., 20° C. to 25° C., 25° C. to 35° C., 25° C. to 30° C., 30° C. to 35° C., or any combinations in the elution profile via iCCD.

It may be desired to minimize the fourth polyethylene fraction 108 in the temperature range of 20° C. to 35° C. Without being bound by theory, it is believed that a high amount of the fourth polyethylene fraction 108 may prevent the polyethylene composition from achieving the desired blocking properties.

In one or more embodiments, the polyethylene composition may have a local minimum in an elution profile via iCCD in a temperature range of from 30° C. to 40° C. This local minimum may fall between the peak 118 of the fourth polyethylene fraction 108 and the peak 112 of the first polyethylene fraction 102.

It should be understood that two or more polyethylene fractions may overlap with one another. In one or more embodiments, the first polyethylene area fraction 102 the fourth polyethylene area fraction 108 may overlap.

In one or more embodiments, the polyethylene composition is formed from the polymerization of ethylene and comonomers such as a C3-C12 alkene. Contemplated comonomers include C6-C9 alkenes, such as 1-octene and 1-hexene. In one or more embodiments the comonomers is 1-octene.

In one or more embodiments, the weight average molecular weight of the first polyethylene fraction may be less than or equal to 225,000 g/mol, such as from 30,000 g/mol to 225,000 g/mol, 60,000 g/mol to 150,000 g/mol, or from 90,000 g/mol to 120,000 g/mol, or any combination of these ranges. Molecular weight of the polyethylene fractions may be calculated based on iCCD results, as described hereinbelow.

In one or more embodiments, the weight average molecular weight of the second polyethylene fraction may be less than or equal to 225,000 g/mol, such as from 25,000 g/mol to 225,000 g/mol, 50,000 g/mol to 150,000 g/mol, from 75,000 g/mol to 125,000 g/mol, or any combination of these ranges. Molecular weight of the polyethylene fractions may be calculated based on iCCD results, as described hereinbelow.

In one or more embodiments, the presently-disclosed polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The polyethylene compositions may contain from about 0.1 to about 10 percent by the combined weight of such additives, based on the weight of the polyethylene composition including such additives.

In embodiments, a ratio of the molecular weight of the first polyethylene area fraction to the molecular weight of the total area of the elution profile is from 0.5 to 1.5. In embodiments, the ratio may be from 0.5 to 1.5, 0.5 to 1.0, or 1.0 to 1.5.

Polymerization

Any conventional polymerization processes may be employed to produce the polyethylene compositions described herein. Such conventional polymerization processes include, but are not limited to, gas phase polymerization processes, slurry polymerization processes, solution polymerization process, using one or more conventional reactors, e.g., loop reactors, isothermal reactors, stirred tank reactors, pipe flow reactors, plug flow reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115° C. to 250° C. (e.g., from 115° C. to 210° C.), and at pressures in the range of from 300 psi to 3,000 psi (e.g., from 400 psi to 800 psi). In some embodiments, in a dual reactor, the temperature in the first reactor is in the range of from 115° C. to 190° C. (e.g., from 150° C. to 180° C.), and the second reactor temperature is in the range of 150° C. to 250° C. (e.g., from 180° C. to 220° C.). In other embodiments, in a single reactor, the temperature in the reactor is in the range of from 115 to 250° C. (e.g., from 115° C. to 225° C.).

The residence time in solution phase polymerization process may be in the range of from 2 minutes to 30 minutes (e.g., from 5 minutes to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the polyethylene composition may be produced via solution polymerization in a dual reactor system, for example a dual loop reactor system, wherein ethylene is polymerized in the presence of one or more catalyst systems and one or more comonomers. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems and one or more comonomers Catalyst Systems Specific embodiments of catalyst systems that can, in one or more embodiments, be used to produce the polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art. Without being bound by theory, it is believed that the catalyst systems produce a mixture of a low density component in the temperature range of 35° C. to 70° C., which may therefore allow the polyethylene composition to achieve the desired hot tack initiation temperature, heat seal initiation temperature or both, and a high density component in the temperature range of 35° C. to 70° C., which may therefore allow the polyethylene composition to achieve the desired blocking properties.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{40}$)alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "($C_x$-$C_y$)" parenthetical may contain more than y carbon atoms depending on the identity of any groups $R^S$. For example, a "($C_1$-$C_{40}$)alkyl substituted with exactly one group $R^S$, where $R^S$ is phenyl (—$C_6H_5$)" may contain from 7 to 46 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a ($C_1$-$C_{40}$)hydrocarbyl can be an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. In some embodiments, each of the aforementioned ($C_1$-$C_{40}$)hydrocarbyl groups has a maximum of 20 carbon atoms (i.e., ($C_1$-$C_{20}$)hydrocarbyl) and other embodiments, a maximum of 12 carbon atoms.

The terms "($C_1$-$C_{40}$)alkyl" and "($C_1$-$C_{18}$)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" (with square brackets) means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted ($C_6$-$C_{40}$)aryl are substituted ($C_1$-$C_{20}$)aryl; substituted ($C_6$-$C_{18}$)aryl; 2,4-bis[($C_{20}$)alkyl]-phenyl; polyfluorophenyl; pentafluorophenyl; and fluoren-9-one-1-yl.

The term "($C_3$-$C_{40}$)cycloalkyl" means a saturated cyclic hydrocarbon radical of from 3 to 40 carbon atoms that is unsubstituted or substituted by one or more $R^S$. Other cycloalkyl groups (e.g., ($C_x$-$C_y$)cycloalkyl) are defined in an analogous manner as having from x to y carbon atoms and being either unsubstituted or substituted with one or more $R^S$. Examples of unsubstituted ($C_3$-$C_{40}$)cycloalkyl are unsubstituted ($C_3$-$C_{20}$)cycloalkyl, unsubstituted ($C_3$-$C_{10}$)cycloalkyl, cyclopropyl, cyclobutyl, cyclopentyl, cyclohexyl, cycloheptyl, cyclooctyl, cyclononyl, and cyclodecyl. Examples of substituted ($C_3$-$C_{40}$)cycloalkyl are substituted ($C_3$-$C_{20}$)cycloalkyl, substituted ($C_3$-$C_{10}$)cycloalkyl, cyclopentanon-2-yl, and 1-fluorocyclohexyl.

Examples of ($C_1$-$C_{40}$)hydrocarbylene include unsubstituted or substituted ($C_6$-$C_{40}$)arylene, ($C_3$-$C_{40}$)cycloalkylene, and ($C_1$-$C_{40}$)alkylene (e.g., ($C_1$-$C_{20}$)alkylene). In some embodiments, the diradicals are on the same carbon atom (e.g., $—CH_2—$) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. $—CH_2CH_2—$), propan-1,3-diyl (i.e. $—CH_2CH_2CH_2—$), 2-methylpropan-1,3-diyl (i.e. $—CH_2CH(CH_3)CH_2—$). Some examples of $(C_6-C_{50})$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted $—CH_2CH_2—$, $—(CH_2)_3—$, $—(CH_2)_4—$, $—(CH_2)_5—$, $—(CH_2)_6—$, $—(CH_2)_7—$, $—(CH_2)_8—$, $—CH_2C^*HCH_3$, and $—(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, $—CF_2—$, $—C(O)—$, and $—(CH_2)_{14}C(CH_3)_2(CH_2)_5—$ (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_2$, $P(R^P)$, $N(R^N)$, $—N{=}C(R^C)_2$, $—Ge(R^C)_2—$, or $—Si(R^C)—$, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$ heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-$S(O)_2$—, $(C_1-C_{40})$hydrocarbyl-$Si(R^C)_2$—, $(C_1-C_{40})$hydrocarbyl-$N(R^N)$—, $(C_1-C_{40})$hydrocarbyl-$P(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$ heteroalkylene, $(C_2-C_{19})$heterocycloalkyl-$(C_1-C_{20})$ heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_3-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

(I)

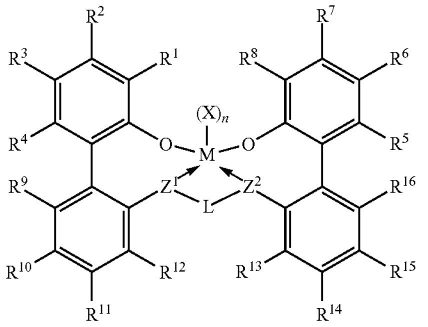

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^N)_2NC(O)$—, halogen, and radicals having formula (II), formula (III), or formula (IV):

(II)

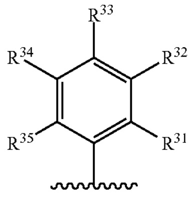

(III)

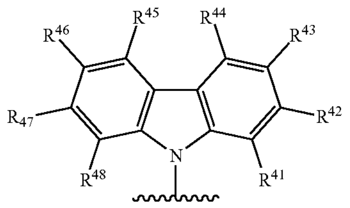

(IV)

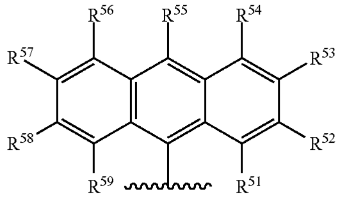

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —N═$CHR^C$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^N)_2NC(O)$—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —N═$CHR^C$, —$OR^C$, —$SR^C$, —$NO_2$, —CN, —$CF_3$, $R^CS(O)$—, $R^CS(O)_2$—, $(R^C)_2C$═N—, $R^CC(O)O$—, $R^COC(O)$—, $R^CC(O)N(R^N)$—, $(R^C)_2NC(O)$—, halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3",5,5"-tris(1,1-dimethylethyl)-5'-octyl[1,1':3',1"-terphenyl]-2'-olato-κO]](2-)]dimethyl-, having the chemical formula $C_{86}H_{128}F_2GeO_4Zr$ and the following structure (V):

(V)

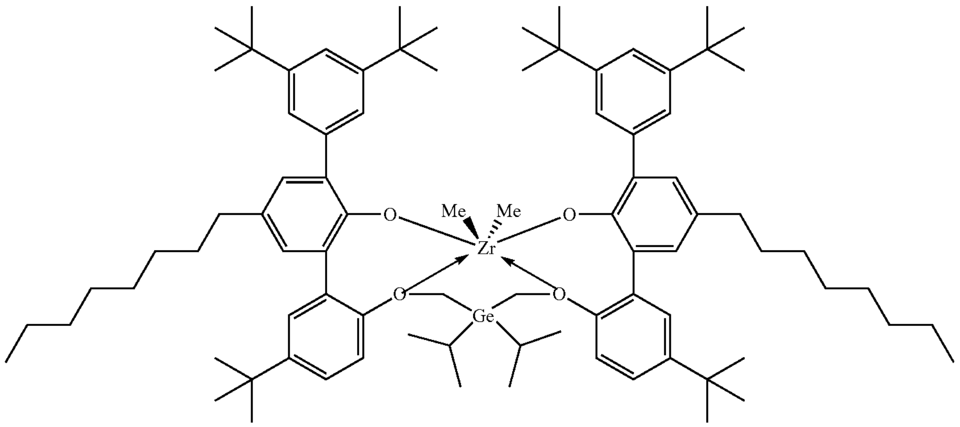

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Zr$ and the following structure (VI):

(VI)

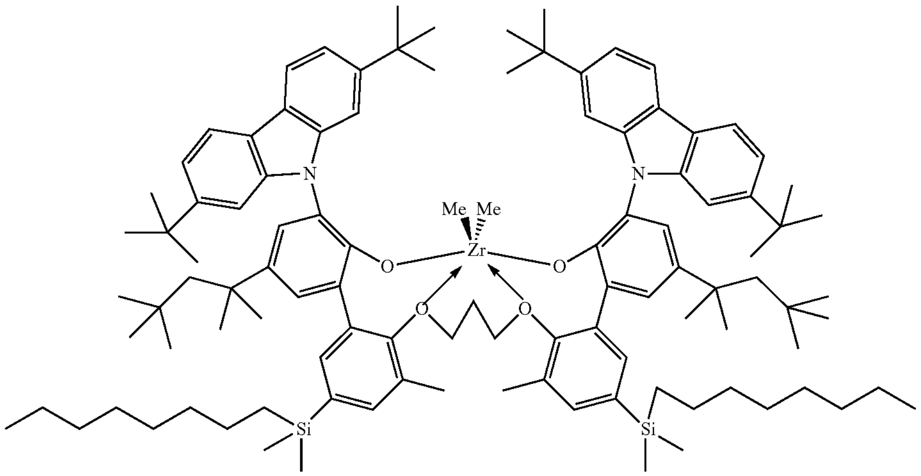

In another embodiment, the procatalyst used in the second loop is hafnium, [[2,2"-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula C107H154N2O4Si2Zr and the following structure (VII):

(VII)

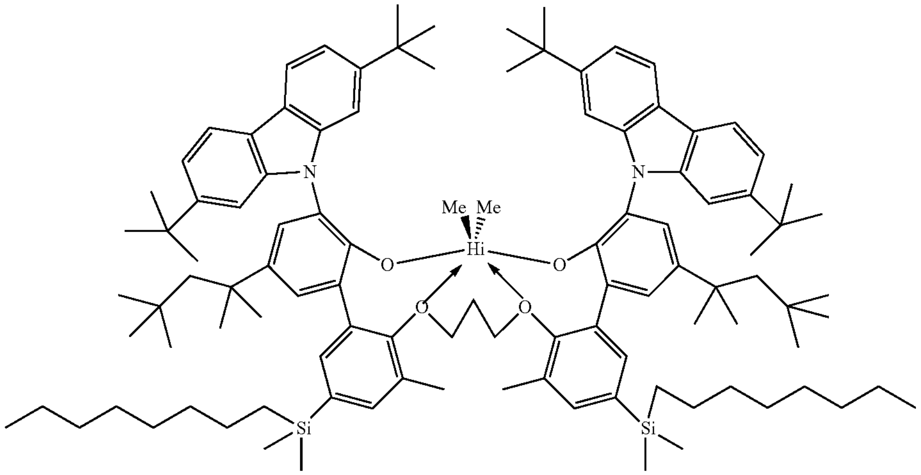

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1\text{-}C_{20})$hydrocarbyl substituents as described herein. In one embodiment, Group 13 metal compounds are tri($(C_1\text{-}C_{20})$hydrocarbyl)-substituted-aluminum or tri($(C_1\text{-}C_{20})$hydrocarbyl)-boron compounds. In other embodiments, Group 13 metal compounds are tri(hydrocarbyl)-substituted-aluminum, tri($(C_1\text{-}C_{20})$hydrocarbyl)-boron compounds, tri($(C_1\text{-}C_{10})$alkyealuminum, tri($(C_6\text{-}C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris ($(C_1\text{-}C_{20})$hydrocarbyl borate (e.g. trityl tetrafluoroborate) or a tri($(C_1\text{-}C_{20})$hydrocarbyl)ammonium tetra($(C_1\text{-}C_{20})$hydrocarbyl)borate (e.g. bis(octadecyl)methylammonium tetrakis (pentafluorophenyl)borate). As used herein, the term "ammonium" means a nitrogen cation that is a $((C_1\text{-}C_{20})\text{hydrocarbyl})_4N^+$ a $((C_1\text{-}C_{20})\text{hydrocarbyl})_3N(H)^+$, a $((C_1\text{-}C_{20})\text{hydrocarbyl})_2N(H)_2^+$, $(C_1\text{-}C_{20})\text{hydrocarbylN}(H)_3^+$, or $N(H)_4^+$, wherein each $(C_1\text{-}C_{20})$hydrocarbyl, when two or more are present, may be the same or different.

Combinations of neutral Lewis acid activators (co-catalysts) include mixtures comprising a combination of a tri($(C_1\text{-}C_4)$alkyl)aluminum and a halogenated tri($(C_6\text{-}C_{18})$aryl)boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate$(1^-)$ amine, and combinations thereof.

In some embodiments, one or more of the foregoing activating co-catalysts are used in combination with each other. An especially preferred combination is a mixture of a tri($(C_1\text{-}C_4)$hydrocarbyl)aluminum, tri($(C_1\text{-}C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the aluminum that are employed is at least 10 times the number of moles of the metal-ligand complex of formula (I). For example, when tris(pentafluorophenyl)borane alone may be used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Films

In some embodiments, the presently-disclosed embodiments relate to films formed from any of the presently-disclosed polyethylene compositions as described herein. In some embodiments, the film may be a blown film or a cast film. In embodiments, the film may be an extrusion coated film. In embodiments, the film may be blown machine directed oriented film or a cast film tenter frame oriented film. In some embodiments, the film may be a monolayer film. The film, in some embodiments, may be a multilayer film. In some embodiments of multilayer films that include the presently-disclosed polyethylene compositions, a multilayer film may include a polyethylene composition of the present disclosure in a surface layer and/or in an inner layer. In embodiments, the presently-disclosed polyethylene compositions may be in a sealant layer of a multilayer film, where applying the polyethylene composition described herein to at least one surface of a substrate layer, thereby forms a sealant layer associated with the at least one surface of the substrate layer. The sealant layer may be applied to the substrate layer of a blown film or a cast film, for example, by a coextrusion process. In embodiments, the sealant layer may be directly applied to the substrate layer as an extrusion coating. A sealant layer may provide a heat-sealable surface. As used herein, a heat-sealable surface is a surface that may allow the surface of the film to be heat-sealed to another surface of the same film or to the surface of another film or substrate.

In one or more embodiments, the presently-disclosed polyethylene compositions may be blended with other polymers, such as other polyethylenes or even other non-polyethylene-based polymers. For example, the presently-disclosed polyethylene compositions may be blended with conventional polyethylene compositions such as, without limitation, LDPEs, LLDPEs, and/or HDPEs, known to those skilled in the art.

The amount of the polyethylene composition to use in films of the present embodiments can depend on a number of factors including, for example, whether the film is a monolayer or multilayer film, the other layers in the film if it is a multilayer film, the end use application of the film, and others.

Films of the present disclosure can have a variety of thicknesses. The thickness of the film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a film of the present disclosure has a thickness of up to 10 mils. For example, the film can have a thickness from a lower limit of 0.25 mils, 0.5 mils, 0.7 mils, 1.0 mil, 1.75 mils, or 2.0 mils to an upper limit of 4.0 mils, 6.0 mils, 8.0 mils, or 10 mils. In embodiments, the film can have a thickness from 0.25 mils, to 2.0 mils, from 0.25 mils to 1.75 mils, from 0.25 mils to 1.0 mils, from 0.25 mils to 0.7 mils, from 0.25 mils to 0.5 mils, from 0.5 mils, to 2.0 mils, from 0.5 mils to 1.75 mils, from 0.5 mils to 1.0 mils, from 0.5 mils to 0.7 mils, from 0.7 mils, to 2.0 mils, from 0.7 mils to 1.75 mils, from 0.7 mils to 1.0 mils, from 1.0 mils, to 2.0 mils, from 1.0 mils to 1.75 mils, from 1.75 mils, to 2.0 mils, or any combinations.

In embodiments where the film comprises a multilayer film, the number of layers in the film can depend on a number of factors including, for example, the desired properties of the film, the desired thickness of the film, the content of the other layers of the film, the end use application of the film, the equipment available to manufacture the film, and others. A multilayer blown film can comprise up to 2, 3, 4, 5, 6, 7, 8, 9, 10, or 11 layers in various embodiments.

The polyethylene compositions, in some embodiments, can be used in more than one layer of the film. Other layers within a multilayer film of the present disclosure can comprise, in various embodiments, a polymer selected from the following: the presently-disclosed polyethylene compositions, a LLDPE, a VLDPE (a very low density polyethylene), a MDPE, a LDPE, a HDPE, a HMWHDPE (a high molecular weight HDPE), a propylene-based polymer, a polyolefin plastomer (POP), a polyolefin elastomer (POE), an olefin block copolymer (OBC), an ethylene vinyl acetate, an ethylene acrylic acid, an ethylene methacrylic acid, an ethylene methyl acrylate, an ethylene ethyl acrylate, an ethylene butyl acrylate, an isobutylene, a maleic anhydride-grafted polyolefin, an ionomer of any of the foregoing, or a combination thereof. In some embodiments, a multilayer film of the present disclosure can comprise one or more tie layers known to those of skill in the art.

In additional embodiments of the polyolefin films described herein, other layers may be adhered to, for example, a polyethylene film by a tie layer (sometimes in addition to a barrier layer). A tie layer may be used to adhere layers of dissimilar materials. For example, a barrier layer comprising ethylene vinyl alcohol (EVOH) may be adhered to a polyethylene material by a tie layer (i.e. a tie layer comprising maleic anhydride grafted polyethylene). For example, the polyolefin film can further comprise other layers typically included in multilayer structures depending on the application including, for example, other barrier layers, structural or strength layers, sealant layers, other tie layers, other polyethylene layers, polypropylene layers, etc. In additional embodiments, a printed layer may be included that may be an ink layer, which is applied to the film, to show product details and other packaging information in various colors.

It should be understood that any of the foregoing layers can further comprise one or more additives as known to those of skill in the art such as, for example, antioxidants, ultraviolet light stabilizers, thermal stabilizers, slip agents, antiblocks, pigments or colorants, processing aids, crosslinking catalysts, flame retardants, fillers and foaming agents. In some embodiments, the polyethylene compositions comprise up to 5 weight percent of such additional additives. All individual values and subranges from 0 to 5 wt. % are included and disclosed herein; for example, the total amount of additives in the polymer blend can be from a lower limit of 0, 0.5, 1, 1.5, 2, or 2.5 wt. % to an upper limit of 1.5, 2, 2.5, 3, 3.5, 4, 4.5, or 5 wt. %. In embodiments, the total amount of additives in the polymer blend can be from 0 wt. % to 5 wt. %, 0 wt. % to 4.5 wt. %, 0 wt. % to 4 wt.

%, 0 wt. % to 3.5 wt. %, 0 wt. % to 3 wt. %, 0 wt. % to 2.5 wt. %, 0 wt. % to 2 wt. %, 0 wt. % to 1.5 wt. %, 0 wt. % to 1 wt. %, 0 wt. % to 0.5 wt. %, 0.5 wt. % to 5 wt. %, 0.5 wt. % to 4.5 wt. %, 0.5 wt. % to 4 wt. %, 0.5 wt. % to 3.5 wt. %, 0.5 wt. % to 3 wt. %, 0.5 wt. % to 2.5 wt. %, 0.5 wt. % to 2 wt. %, 0.5 wt. % to 1.5 wt. %, 0.5 wt. % to 1 wt. %, 1 wt. % to 5 wt. %, 1 wt. % to 4.5 wt. %, 1 wt. % to 4 wt. %, 1 wt. % to 3.5 wt. %, 1 wt. % to 3 wt. %, 1 wt. % to 2.5 wt. %, 1 wt. % to 2 wt. %, 1 wt. % to 1.5 wt. %, 1.5 wt. % to 5 wt. %, 1.5 wt. % to 4.5 wt. %, 1.5 wt. % to 4 wt. %, 1.5 wt. % to 3.5 wt. %, 1.5 wt. % to 3 wt. %, 1.5 wt. % to 2.5 wt. %, 1.5 wt. % to 2 wt. %, 2 wt. % to 5 wt. %, 2 wt. % to 4.5 wt. %, 2 wt. % to 4 wt. %, 2 wt. % to 3.5 wt. %, 2 wt. % to 3 wt. %, 2 wt. % to 2.5 wt. %, 2.5 wt. % to 5 wt. %, 2.5 wt. % to 4.5 wt. %, 2.5 wt. % to 4 wt. %, 2.5 wt. % to 3.5 wt. %, 2.5 wt. % to 3 wt. %, 3 wt. % to 5 wt. %, 3 wt. % to 4.5 wt. %, 3 wt. % to 4 wt. %, 3 wt. % to 3.5 wt. %, 3.5 wt. % to 5 wt. %, 3.5 wt. % to 4.5 wt. %, 3.5 wt. % to 4 wt. %, 4 wt. % to 5 wt. %, 4 wt. % to 4.5 wt. %, or 4.5 wt. % to 5 wt. %, or any combinations of these ranges.

By being polyethylene compositions, the presently-disclosed polyethylene compositions, according to some embodiments, can be incorporated into multilayer films and articles that are comprised primarily, if not substantially or entirely, of polyolefins, or more preferably, of polyethylene, in order to provide a film and article that is more easily recyclable. The polyethylene-based compositions of the present disclosure are particularly advantageous in proving films wherein the film is formed primarily from polyethylene. For example, a monolayer or multilayer film wherein the film comprises primarily polyethylene may have an improved recyclability profile in addition to other advantages that the usage of such polymers may provide. In some embodiments, the film comprises 90 wt. % or more polyethylene based on the total weight of the film. In other embodiments, the film comprises 91 wt. % or more, 92 wt. % or more, 93 wt. % or more, 94 wt. % or more, 95 wt. % or more, 96 wt. % or more, 97 wt. % or more, 98 wt. % or more, or 99 wt. % or more polyethylene based on the total weight of the film.

In some embodiments, the film comprising a layer formed from the presently-disclosed polyethylene compositions can be laminated to another film substrate. Substrates may include films comprising polyester, nylon, polypropylene, polyethylene, and combinations. For preferred recyclability substrates, a biaxially oriented polyethylene (BOPE) substrate, a machine direction oriented polyethylene (MDO) substrate, or a coextruded polyethylene film may be included in the laminate structure.

Films of the present disclosure, in some embodiments, can be corona treated and/or printed (e.g., reverse or surface printed) using techniques known to those of skill in the art.

In some embodiments, films of the present disclosure can be oriented, uniaxially (e.g., in the machine direction) or biaxially using techniques known to those of skill in the art.

In embodiments, films including the polyethylene compositions of the present disclosure prepared according to the method described hereinbelow may be sealed according to ASTM F88 and have a heat seal initiation temperature of from 40° C. to 80° C., for example, at a 0.5 second dwell time, 40 psi seal bar pressure, after at least 24 hours, and peeled at the rate of 10 inch/min. The maximum load measured during the peel may be determined at multiple sealing temperatures and the temperature at which an average maximum load of 2 lb is achieved, which is defined as the "heat seal initiation temperature." For example, in embodiments, multilayer films including the polyethylene compositions of the present disclosure prepared according to the method described hereinbelow may have a heat seal initiation temperature of from 40° C. to 80° C., 40° C. to 70° C., 40° C. to 60° C., 40° C. to 50° C., 50° C. to 80° C., 50° C. to 70° C., 50° C. to 60° C., 60° C. to 80° C., 60° C. to 70° C., 70° C. to 80° C., or any combinations. Similar methods may be utilized to observe the heat seal initiation temperature of monolayer and other multilayer films. In embodiments, monolayer and other multilayer films may have a heat seal initiation temperatures less than comparative films that do not utilize the polyethylene compositions described herein. The presently-disclosed polyethylene compositions may provide films with relatively high densities and relatively heat seal initiation temperatures.

In embodiments, films including the polyethylene compositions of the present disclosure prepared according to the methods described hereinbelow may have a hot tack initiation temperature of from 50° C. to 90° C. when measured according to ASTM F1921 (Method B), for example, by creating a 0.5 inch deep and 1 inch wide seal and applying 0.275 N/mm$^2$ pressure for 0.5 seconds. After, for example, an 0.18 second dwell time, the sealed region may be peeled at the rate of 200 mm/s. The maximum load measured during the peel may be determined at multiple sealing temperatures, and the temperature at which an average maximum load of 4 N was achieved is defined as hot tack initiation temperature. In embodiments, films including the polyethylene compositions of the present disclosure prepared according to the method described hereinbelow may have a hot tack initiation temperature of from 50° C. to 90° C., 50° C. to 80° C., 50° C. to 70° C., 50° C. to 60° C., 60° C. to 90° C., 60° C. to 80° C., 60° C. to 70° C., 70° C. to 90° C., 70° C. to 80° C., 80° C. to 90° C., or any combinations. Similar methods may be utilized to observe the hot tack initiation temperature of monolayer and other multilayer films. In embodiments, monolayer and other multilayer films may have a hot tack initiation temperatures less than comparative films that do not utilize the polyethylene compositions described herein. The presently-disclosed polyethylene compositions may provide films with relatively high densities and relatively low hot tack initiation temperatures.

In embodiments, films including the polyethylene compositions of the present disclosure may have a blocking force of less than 40 mN/inch or less than 35 mN/inch when measured according to the methods described hereinbelow. Similar methods may be utilized to observe the blocking force of monolayer and other multilayer films. In embodiments of monolayer and other multilayer films may have a blocking force comparable to or less than comparative films that do not utilize the polyethylene compositions described herein.

Articles

Embodiments of the present disclosure also relate to articles, such as packages, formed from or incorporating polyethylene compositions of the present disclosure (i.e., through films incorporating polyethylene compositions of the present disclosure). Such packages can be formed from any of the polyethylene compositions of the present disclosure (i.e., through films incorporating polyethylene-based compositions of the present disclosure) described herein. Such packages formed from any of the polyethylene compositions of the present disclosure may be sealable by various sealing methods known in the art, such as heat seal methods.

Examples of such articles can include flexible packages, pouches, stand-up pouches, and pre-made packages or pouches. In some embodiments, multilayer films or laminates of the present disclosure can be used for food packages. Examples of food that can be included in such packages include meats, cheeses, cereal, nuts, snacks, juices, sauces, and others. Such packages can be formed using techniques known to those of skill in the art based on the teachings herein and based on the particular use for the package (e.g., type of food, amount of food, etc.).

Low heat seal initiation temperatures such as those provided by the polyethylene compositions of the present invention may be particularly desirable for automated packaging systems where the item being packaged is loaded into the package as it is being made. Lower heat seal initiation temperatures may be advantageous to increase packaging productivity by minimizing the time and energy needed to heat and cool a sealant. In the case of recyclable polyethylene packaging having an inner sealant layer that seals at a temperature significantly lower than that of the outside polyethylene layer may enable a broader range of temperatures to make heat sealed packages, which may often be referred to as the packaging heat seal window. Some examples of such automated packaging equipment are called vertical form fill and seal (VFFS) machines or horizontal form fill and seal (HFFS) machines.

Test Methods

Unless otherwise indicated herein, the following analytical methods are used in describing aspects of the present disclosure:

Melt Index

Melt indices $I_2$ (or I2) and $I_{10}$ (or I10) of polymer samples were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of c vs. t, where c is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° Celsius and the column compartment was set at 150° Celsius. The columns used were 4 Agilent "Mixed A" 30 cm 20-micron linear mixed-bed columns and a 20-um pre-column. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 to 8,400,000 and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$M_{polyethylene}=A\times(M_{polystyrene})^B \quad \text{(EQ. 1)}$$

where M is the molecular weight, A has a value of 0.4315 and B is equal to 1.0.

A fifth order polynomial was used to fit the respective polyethylene-equivalent calibration points. A small adjustment to A (from approximately 0.375 to 0.445) was made to correct for column resolution and band-broadening effects such that linear homopolymer polyethylene standard is obtained at 120,000 Mw.

The total plate count of the GPC column set was performed with decane (prepared at 0.04 g in 50 milliliters of TCB and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max}}{\text{Peak Width at } \frac{1}{2} \text{ height}} \right)^2 \quad \text{(EQ. 2)}$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(EQ. 3)}$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 18,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of $Mn_{(GPC)}$, $Mw_{(GPC)}$, and $Mz_{(GPC)}$ were based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn_{(GPC)} = \frac{\sum^{i} IR_i}{\sum^{i} \left(IR_i / M_{polyethylene_i}\right)} \quad \text{(EQ. 4)}$$

$$Mw_{(GPC)} = \frac{\sum^{i} \left(IR_i * M_{polyethylene_i}\right)}{\sum^{i} IR_i} \quad \text{(EQ. 5)}$$

$$Mz_{(GPC)} = \frac{\sum^{i} \left(IR_i * M_{polyethylene_i}^{2}\right)}{\sum^{i} \left(IR_i * M_{polyethylene_i}\right)} \quad \text{(EQ. 6)}$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 7. Processing of the flow marker peak was done via the PolymerChar GPCOne™ Software. Acceptable flowrate correction is such that the effective flowrate should be within +1-0.5% of the nominal flowrate.

$$\text{Flowrate}_{(effective)} = \text{Flowrate}_{(nominal)} * (RV_{(FM\ Calibrated)} / RV_{(FM\ Sample)}) \quad \text{(EQ. 7)}$$

Improved Method for Comonomer Content Distribution Analysis (iCCD)

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Zero-Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations 8 and 9:

$$ZSVR = \frac{\eta_{0B}}{\eta_{0L}} \quad \text{(EQ. 8)}$$

$$\eta_{0L} = 2.29 \times 10^{-15} M_{w-gpc}^{3.65} \quad \text{(EQ. 9)}$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

Blocking Force

Blocking force measurements are sensitive to the thermal history of the film samples. Films were produced on a Labtech 5 layer blown film line (as further described in Example 5 below). The blown films were collapsed at the nip after the bubble and were not separated and slit into two webs. Samples tested for blocking force were fabricated, stored and tested at 23±2° C. temperature. First, 6 inches×1 inch strips were punched out of the collapsed bubble of films, with the longer dimension being along the machine direction. Approximately one-inch lengths of the two layers were separated by hand at one edge. The separated layers were clamped in the grips of an Instron frame (initial grip separation=1.5 inch) and pulled apart at the rate of 1 inch/min (180° peel). The test was continued until an additional 4 inches of the layers had been separated. The force-displacement curve was recorded during test. The force rapidly increased initially and then plateaued. The plateau force is measure of the blocking force. A few "spikes" in force may be observed as the layers were separated. The spikes may be due to improper cutting of the films leaving random points along the length of the specimen that were "stuck" together. To avoid falsely exaggerating the blocking force due to these spikes, the most frequent value of force in the plateau region (Mode) was taken as the measure of blocking instead of the average (Mean). At least five specimens were tested from each collapsed bubble. Results were reported as average±standard deviation of the blocking force measured from all the samples.

Hot Tack Initiation Temperature

Hot tack refers to the strength of a heat seal formed between films after the seal has been made and before it cools to room temperature. The hot tack test may be used to determine the seal strength and appropriate sealing parameters of a heat sealing process. The hot tack initiation temperature was measured according to ASTM F1921 (Method B).

Heat Seal Initiation Temperature

The heat seal test may be used to determine the suitable sealing parameters (such as sealing temperature, dwell time, and pressure) for a film. The heat seal initiation temperature was measured according to according to ASTM F-88 (Technique A).

Dynamic Shear Rheology

Samples were compression molded at 190° C., for 6.5 minutes at pressure of 25000 lbs in air, and the plaques were subsequently allowed to cool down on lab bench. Plaque thickness was ~3 mm. Constant temperature frequency sweep measurements were performed on an ARES strain controlled parallel plate rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method had an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic complex viscosity (η*), and tan (δ) or tan delta were calculated.

EXAMPLES

Example 1: Preparation of Polyethylene Compositions 1-3

Polyethylene Compositions 1-3, which are described according to the one or more embodiments of the detailed description, were prepared by a method and utilizing the catalysts and reactors described below.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

Figure 2:
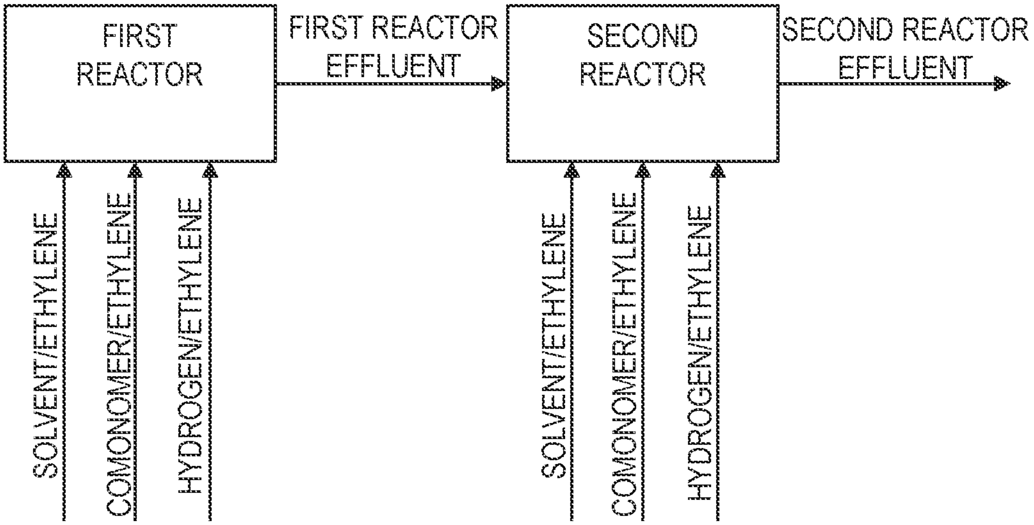
FIG. 2 schematically depicts a reactor system useful for producing polyethylene, according to one or more embodiments presently described.

A two reactor system was used in a series configuration, as is depicted in FIG. 2. Each continuous solution polymerization reactor utilized a liquid full, non-adiabatic, isothermal, circulating, loop reactor, which mimicked a continuously stirred tank reactor (CSTR) with heat removal. Independent control of all fresh solvent, monomer, comonomer, hydrogen, and catalyst component feeds were possible. The total fresh feed stream to each reactor (solvent, monomer, comonomer, and hydrogen) was temperature controlled to maintain a single solution phase by passing the feed stream through a heat exchanger. The total fresh feed to each polymerization reactor was injected into the reactor at two locations with approximately equal reactor volumes between each injection location. The fresh feed was controlled so that each injector received half of the total fresh feed mass flow. The catalyst components were injected into the polymerization reactor through injection stingers. The catalyst feed was computer controlled to maintain each reactor monomer conversion at the specified targets. The cocatalyst components were fed based on calculated specified molar ratios to the primary catalyst component. Immediately following each reactor feed injection location, the feed streams were mixed with the circulating polymerization reactor contents with static mixing elements. The contents of each reactor were continuously circulated through heat exchangers responsible for removing much of the heat of reaction and with the temperature of the coolant side responsible for maintaining an isothermal reaction environment at the specified temperature. Circulation around each reactor loop was provided by a pump.

The effluent from the first polymerization reactor (containing solvent, monomer, comonomer, hydrogen, catalyst components, and polymer) exited the first reactor loop and was added to the second reactor loop.

The second reactor effluent entered a zone where it was deactivated with the addition of and reaction with a suitable reagent (water). At this same reactor exit location, other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent entered a devolatization system where the polymer was removed from the non-polymer stream. The isolated polymer melt was pelletized and collected. The non-polymer stream passed through various pieces of equipment, which separated most of the ethylene that was removed from the system. Most of the solvent and unreacted comonomer was recycled back to the reactor after passing through a purification system. A small amount of solvent and comonomer was purged from the process.

The reactor stream feed data flows that correspond to the values in Table 1. The data are presented such that the complexity of the solvent recycle system was accounted for and the reaction system can be treated more simply as a once through flow diagram. Table 2 shows the catalysts referenced in Table 1.

TABLE 1

| Polyethylene Composition | | Polyethylene Composition 1 | Polyethylene Composition 2 | Polyethylene Composition 3 |
|---|---|---|---|---|
| Reactor Configuration | Type | Dual Series | Dual Series | Dual Series |
| Comonomer type | Type | 1-octene | 1-octene | 1-octene |
| First Reactor Feed Solvent/Ethylene Mass Flow Ratio | g/g | 3.7 | 3.7 | 3.8 |
| First Reactor Feed Comonomer/Ethylene Mass Flow Ratio | g/g | 0.86 | 0.86 | 0.75 |
| First Reactor Feed Hydrogen/Ethylene Mass Flow Ratio | g/g | 1.5E−04 | 1.8E−04 | 1.8E−04 |
| First Reactor Temperature | ° C. | 165 | 165 | 165 |
| First Reactor Pressure | barg | 50 | 50 | 50 |
| First Reactor Ethylene Conversion | % | 86.1 | 87.1 | 91.5 |

TABLE 1-continued

| Polyethylene Composition | | Polyethylene Composition 1 | Polyethylene Composition 2 | Polyethylene Composition 3 |
|---|---|---|---|---|
| First Reactor Catalyst Type | Type | Catalyst Component B | Catalyst Component B | Catalyst Component B |
| First Reactor Catalyst Metal | Type | Zr | Zr | Zr |
| First Reactor Co-Catalyst 1 Type | Type | Co-Catalyst A | Co-Catalyst A | Co-Catalyst A |
| First Reactor Co-Catalyst 2 Type | Type | Co-Catalyst B | Co-Catalyst B | Co-Catalyst B |
| First Reactor Co-Catalyst 1 to Catalyst Molar Ratio (B to Metal ratio) | Ratio | 1.2 | 1.2 | 1.2 |
| First Reactor Co-Catalyst 2 to Catalyst Molar Ratio (Al to Metal ratio) | Ratio | 12.7 | 14.6 | 153.0 |
| First Reactor Residence Time | min | 10.6 | 10.8 | 11.7 |
| Second Reactor Feed Solvent/Ethylene Mass Flow Ratio | g/g | 1.9 | 1.9 | 2.0 |
| Second Reactor Feed Comonomer/Ethylene Mass Flow Ratio | g/g | 0.271 | 0.268 | 0.194 |
| Second Reactor Feed Hydrogen/Ethylene Mass Flow Ratio | g/g | 0.2E−04 | 4.1E−05 | 3.6E−04 |
| Second Reactor Temperature | ° C. | 190 | 190 | 190 |
| Second Reactor Pressure | barg | 50 | 50 | 50 |
| Second Reactor Ethylene Conversion | % | 84.4 | 84.3 | 85.6 |
| Second Reactor Catalyst Type | Type | Catalyst Component C | Catalyst Component C | Catalyst Component E |
| Second Reactor Catalyst Metal | Type | Hf | Hf | Zr |
| Second Reactor Co-Catalyst 1 Type | Type | Co-Catalyst A | Co-Catalyst A | Co-Catalyst A |
| Second Reactor Co-Catalyst 2 Type | Type | Co-Catalyst B | Co-Catalyst B | Co-Catalyst B |
| Second Reactor Co-Catalyst 1 to Catalyst Molar Ratio (B to Metal ratio) | mol/mol | 6.2 | 6.6 | 6.0 |
| Second Reactor Co-Catalyst 2 to Catalyst Molar Ratio (Al to Metal ratio) | mol/mol | 235.0 | 243.0 | 101.0 |
| Second Reactor Residence Time | min | 7.5 | 7.5 | 7.7 |

TABLE 2

| | |
|---|---|
| Catalyst component B | 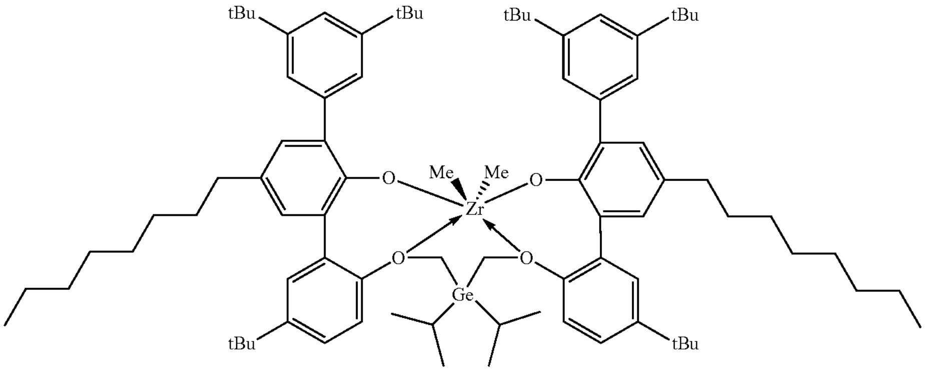 |
| Catalyst component C | 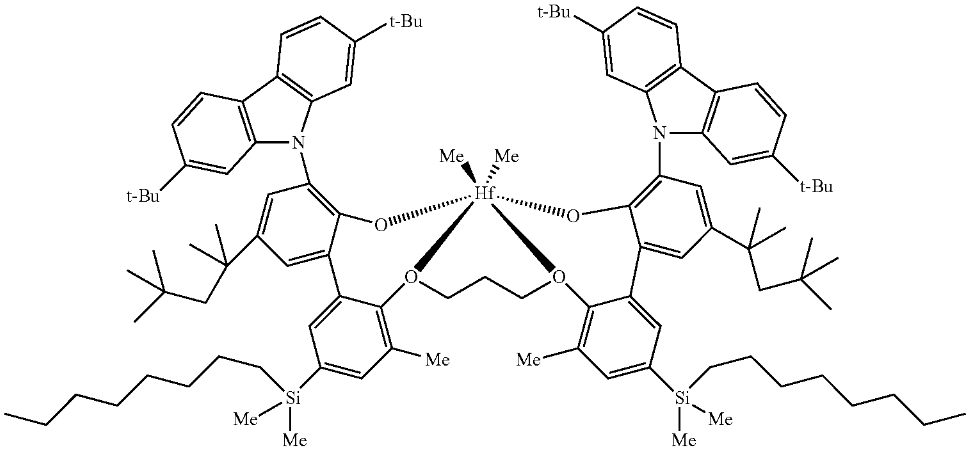 |

TABLE 2-continued

Catalyst component E

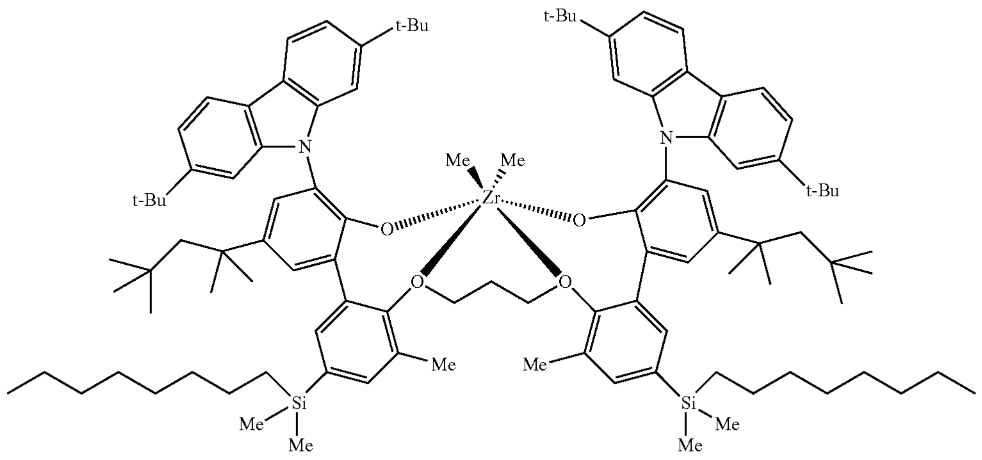

Co-catalyst A

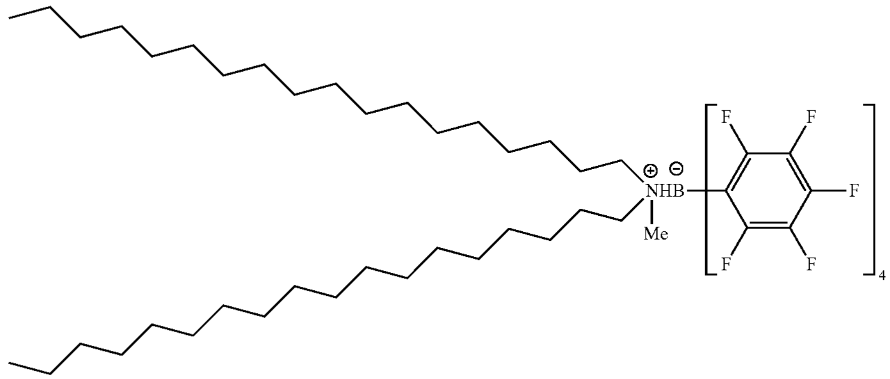

Co-catalyst B — modified methyl aluminoxane

Example 2: Comparative Compositions A-G

Table 3 identifies the commercially-available polyethylene compositions of Comparative Polyethylene Compositions A-G.

TABLE 3

| Comparative Polyethylene Composition | Commercial Name (Company of Manufacture) |
|---|---|
| A | EXCEED 1012 (ExxonMobil) |
| B | ELITE ™ AT 6101 (Dow Chemical Co.) |
| C | ELITE ™ AT 6202 (Dow Chemical Co.) |
| D | AFFINITY ™ PL 1880 G (Dow Chemical Co.) |
| E | AFFINITY ™ PF 1140 G (Dow Chemical Co.) |
| F | ELITE ™ 5500 G (Commercial Ref. 1) (Dow Chemical Co.) |
| G | ELITE ™ 5500 G (Commercial Ref. 2) (Dow Chemical Co.) |

Example 3: Analysis of Polyethylene Compositions 1-3 of Example 1 and Comparative Polyethylene Compositions A-G of Example 2

Polyethylene Compositions 1-3 of Example 1 and Comparative Polyethylene Compositions A-G of Example 2 were analyzed by iCCD. The data generated from the iCCD testing of all samples (Polyethylene Compositions 1-3 of Example 1 and Comparative Polyethylene Compositions A-G) is provided in Tables 4A and 4B. Specifically, Table 4A includes analysis of the iCCD data in temperature increments of 5° C.).

TABLE 4A

| Sample ID | 25° C.-70° C. | 70° C.-85° C. | 85° C.-120° C. |
|---|---|---|---|
| Comparative PE Comp. A | 30.19% | 57.67% | 12.14% |
| Comparative PE Comp. B | 45.79% | 53.42% | 0.79% |
| Comparative PE Comp. C | 39.91% | 57.71% | 2.39% |
| Comparative PE Comp. D | 70.79% | 28.68% | 0.52% |
| Comparative PE Comp. E | 86.99% | 11.75% | 1.25% |
| Comparative PE Comp. F | 46.52% | 22.11% | 31.37% |
| Comparative PE Comp. G | 45.83% | 23.15% | 31.02% |
| PE Comp. 1 | 60.29% | 3.15% | 36.56% |
| PE Comp. 2 | 60.15% | 2.70% | 37.16% |
| PE Comp. 3 | 59.55% | 4.65% | 35.80% |

Table 4B further delineates the iCCD data to include the areas of the respective polyethylene fractions (25° C.-35° C., 35° C.-70° C., 70° C.-85° C., and 85° C.-120° C.).

TABLE 4B

| Sample ID | Weight Percent (wt. %) in Each Temperature Zone 20° C.-35° C. | 35° C.-70° C. | 70° C.-85° C. | 85° C.-120° C. |
|---|---|---|---|---|
| Compara. PE Comp. A | 0.27% | 29.93% | 57.67% | 12.14% |
| Compara. PE Comp. B | 2.38% | 43.40% | 53.42% | 0.79% |
| Compara. PE Comp. C | 0.60% | 39.30% | 57.71% | 2.39% |
| Compara. PE Comp. D | 0.46% | 70.34% | 28.68% | 0.52% |
| Compara. PE Comp. E | 4.47% | 82.52% | 11.75% | 1.25% |
| Compara. PE Comp. F | 1.85% | 44.67% | 22.11% | 31.37% |
| Compara. PE Comp. G | 1.68% | 44.15% | 23.15% | 31.02% |
| PE Comp. 1 | 10.08% | 50.21% | 3.15% | 36.56% |
| PE Comp. 2 | 11.88% | 48.27% | 2.70% | 37.16% |
| PE Comp. 3 | 25.92% | 33.63% | 4.65% | 35.80% |

As shown in Tables 4A and 4B, the samples of Polyethylene Compositions 1-3 showed the greatest percent in the 85° C.-120° C. range and the lowest percent in the 70° C.-85° C. range. Additionally, none of the samples of Comparative Polyethylene Compositions A, B, C, F, or G showed a polyethylene fraction from 70° C. to 85° C. that comprised less than 10% of the total area of the elution profile. Additionally, Comparative Polyethylene Compositions D and E failed to show a polyethylene fraction from 85° C. to 120° C. that comprised at least 20% of the total area of the elution profile.

Table 5 provides additional data for each sample of Comparative Polyethylene Compositions A-G and Polyethylene Compositions 1-3 including overall density, melt index, ZSVR, and the ratio of the first fraction molecular weight to the overall molecular weight. These properties were measured based on the test methods described herein.

TABLE 5

| PE Sample | Density ($g/cm^3$) | Melt Index (g/10 min) | ZSVR | Overall Mw (LS90) (g/mol) | First Fraction Mw | Higher Density Fraction Mw | Ratio of First Fraction Molecular Weight to Overall Molecular Weight | $M_w/M_n$ |
|---|---|---|---|---|---|---|---|---|
| A | 0.912 | 1.0 | — | 117,773 | 117,854 | — | 1.00 | 2.43 |
| B | 0.905 | 0.80 | — | 107,188 | 109,408 | — | 1.02 | 3.15 |
| C | 0.910 | 0.85 | — | 120,142 | 126,839 | 104,834 | 1.06 | 2.45 |
| D | 0.902 | 1.0 | 4.58 | 107,073 | 107,246 | — | 1.00 | 2.34 |
| E | 0.896 | 1.6 | — | 101,413 | 104,718 | — | 1.03 | 2.09 |
| F | 0.914 | 1.5 | — | 107,994 | 115,834 | 90,110 | 1.00 | 3.03 |
| G | 0.914 | 1.5 | — | 111,730 | 111,817 | 97,210 | 1.07 | 2.98 |
| 1 | 0.9033 | 1.0 | 1.38 | 119,555 | 127,135 | 125,491 | 1.06 | 2.22 |
| 2 | 0.9035 | 1.0 | 1.27 | 119,224 | 109,963 | — | 0.92 | 2.18 |
| 3 | 0.904 | 3.0 | 1.08 | 90,590 | 95,944 | 99,409 | 1.06 | 2.32 |

As stated previously in this disclosure, tan delta (tan δ) is a measure of how close a material is to a perfectly-elastic solid (where d=0°, tan delta=0) or of how close a material is to a perfectly-Newtonian liquid (where d=90°, tan delta≈infinity). Thus, lower values of tan d reflect greater elasticity. Tan d is a function of LCB and MWD at the same overall molecular weight. Higher tan d values indicate lower LCB.

TABLE 6

| Sample | Tan δ (at 0.1 radian/sec, 190° C.) |
|---|---|
| Compara. PE Comp. A | 50.3 |
| Compara. PE Comp. B | 5.9 |
| Compara. PE Comp. C | 4.9 |
| Compara. PE Comp. D | 6.3 |
| Compara. PE Comp. E | 6.04 |

TABLE 6-continued

| Sample | Tan δ (at 0.1 radian/sec, 190° C.) |
|---|---|
| Compara. PE Comp. F | 10.4 |
| Compara. PE Comp. G | 10.4 |
| PE Comp. 1 | 27.3 |
| PE Comp. 2 | 22.3 |
| PE Comp. 3 | 80.9 |

As shown in Table 6, Polyethylene Compositions 1 and 2 had a tan δ of 27.3 and 22.3, respectively. Polyethylene Composition 3 had a tan δ of 80.9 In comparison, Comparative Polyethylene Compositions A had a tan δ of 50.3, and Comparative Polyethylene Compositions B-G had relatively lower tan δ values (5.9, 4.9, 6.3, 6.04, 10.4, 10.4, respectively).

Example 4: Analysis of Heat Seal Initiation Temperature and Hot Tack Initiation Temperature In Example 4, the heat seal initiation temperature and hot tack initiation temperature was analyzed for films comprising the polyethylene compositions described herein.

To analyze these properties, multilayer films were coextruded on an Alpine 7-layer blown film line. This line was equipped with seven 50 mm single screw extruders of 30 L/D and a 250 mm die. Three-layer (skin, core, and sealant) films with total thickness of 2 mils were made. The skin/core/sealant layer thickness ratio was set at 1/3/1. The skin layer comprised of an 80/20 (by weight) blend of DOWLEX™ 2045G/LDPE 611A, both commercially available from The Dow Chemical Company. The base resin of the core layer comprised the same blend as the skin layer, but additionally with 500 ppm of 10090 Slip PE MB (erucamide, commercially available from Ampacet Corporation) and 10063 Antiblock PE MB (commercially available from Ampacet Corporation), which were added by dry blending. The polyethylene composition used in the sealant layer was varied, as provided subsequently in Table 7. 750 ppm of 10090 Slip PE MB and 2500 ppm of 10063 Antiblock PE MB were introduced in the sealant layer through dry blending. The die gap was set at 78.7 mils, the blow-up ratio was 2.5, the melt temperature was 440° F.-470° F., the output rate was 350 lb/hr and the frost line height was about 37 inches. The bubble of the multilayer film was slit in-line and separated into two rolls.

TABLE 7

| Sample | Sealant Layer |
|---|---|
| Comparative Film A | EXCEED 1012 (ExxonMobil) |
| Comparative Film B | ELITE ™ AT 6101 (Dow Chemical Co.) |
| Comparative Film C | ELITE ™ AT 6202 (Dow Chemical Co.) |
| Comparative Film D | AFFINITY ™ PL 1880 G (Dow Chemical Co.) |
| Comparative Film E | AFFINITY ™ PF 1140 G (Dow Chemical Co.) |
| Film 1 | Polyethylene Composition 1 (of Example 1) |
| Film 2 | Polyethylene Composition 2 (of Example 1) |
| Film 3 | Polyethylene Composition 3 (of Example 1) |

Each of Films 1-3 and Comparative Films A-E were then laminated onto 0.48 mil-thick polyethylene terephthalate (PET) using a Nordmeccanica Super Combi 3000 laminator using a ADCOTE™ 577/CR 87-124 solvent-based adhesive, where the ADCOTE™ 577 and CR 87-124 components were mixed in a weight ratio of 100:7. Prior to applying the solvent-based adhesive, the skin side of each of Films 1-3 and Comparative Films A-E was dosed with 1 kW corona. The adhesive was applied using a 150 channel quad with 11.5 bcm, which produced a 1.75 lbs/rm coating weight via a Gravure roll, and subsequently nipped at 180° F. The films were cured at 25° C. and 40% relative humidity for at least 5-7 days for full chemical cure to produce Laminated Films 1-3 and Comparative Laminated Films A-E.

Hot tack measurements were performed on each of Laminated Films 1-3 and Comparative Laminated Films A-E using an Enepay commercial testing machine according to ASTM F-1921 (Method B). Prior to testing the samples were conditioned for a minimum of 40 hrs at 23° C. and 50% R.H. per ASTM D-618 (Procedure A).

Sheets of dimensions 8.5" by 14" were cut from the film, with the longest dimension in the machine direction. Strips 1" wide and 14" long were cut from the sheets. Tests were performed on these samples over a range of temperatures, and the results were reported as the maximum load as a function of temperature. There temperature steps were 5° C. or 10° C. with 6 replicates performed at each temperature. The parameters used in the test were: a Specimen Width of 25.4 mm (1.0 in); a Sealing Pressure of 0.275 N/mm$^2$; a Sealing Dwell Time of 0.5 s; a Delay time of 0.18 s; a Peel speed of 200 mm/s; and a Seal depth of 0.5 inch. A hot tack curve was created by linear interpolation of the average maximum load measured at each temperature. The minimum temperature at which an average maximum load of 4N was achieved (defined as hot tack initiation temperature) was determined from this curve, and is reported in Table 8.

Heat Seal measurements were performed on each of Laminated Films 1-3 and Comparative Laminated Films A-E using a commercial tensile testing machine according to ASTM F-88 (Technique A).

Prior to cutting, the films were conditioned for a minimum of 40 hrs at 23° C. (±2° C.) and 50% (±10%) R.H. per ASTM D-618 (procedure A). Sheets were then cut from the film in the machine direction to a length of approximately 11 inches and a width of approximately 8.5 inches. The sheets were heat sealed across the machine direction on a Kopp Heat Sealer over a range of temperatures under the following conditions: a Sealing Pressure of 0.275 N/mm$^2$; a Sealing Dwell Time of 1.0 s; and a Depth of seal of 5 mm. The sealed sheets were conditioned for a minimum of 3 hours at 23° (±2° C.) and 50% R.H (±10%) prior to cutting into one inch wide strips. The samples were conditioned for a minimum of 24 hours after sealing at 23° (±2° C.) and 50% R.H (±10%) prior to testing. For testing, the strips were loaded into the grips of a tensile testing machine at an initial separation of 2 inches and pulled at a grip separation rate of 10 inches/min at 23° (±2° C.) and 50% R.H (±10%). The strips were tested unsupported. Five replicate tests are performed for each sealing temperature. The maximum load measured during the peel was determined at multiple sealing temperatures, and a heat seal curve was created by linear interpolation of the average maximum load measured at each temperature. The temperature at which an average maximum load of 2 lb was achieved (defined as heat seal initiation temperature) was determined from this curve, and is provided subsequently in Table 8.

TABLE 8

| Sample | Hot Tack Initiation Temperature (° C.) | Heat Seal Initiation Temperature (° C.) |
|---|---|---|
| Laminated Comparative Film A | 100 | 82 |
| Laminated Comparative Film B | 96 | 82 |
| Laminated Comparative Film C | 98 | 83 |
| Laminated Comparative Film D | 89 | 76 |
| Laminated Comparative Film E | 81 | 72 |
| Laminated Film 1 | 74 | 67 |
| Laminated Film 2 | 74 | 63 |
| Laminated Film 3 | 76 | 73 |

As shown in Table 8, Laminated Films 1-3 exhibited the lowest hot tack initiation temperatures and heat seal temperatures initiation of Laminated Films 1-3 and Comparative Laminated Films A-E.

Example 5: Analysis of Blocking Force

In Example 5, the blocking force was analyzed for films comprising the polyethylene compositions described herein. Blocking force measurements may be sensitive to the thermal history of the samples. All samples tested for blocking force were fabricated and then stored and tested at 23±° C. temperature.

In this example, multilayer films were coextruded on a LabTech 5-layer blown film line. This line was equipped with two 25 mm and three 20 mm single screw extruders or 30 L/D and a 75 mm die. Two-layer (skin and sealant) films with total thickness of 2 mils were made. The skin/core/sealant layer thickness ratio was set at 4/1. The skin layer comprised of an 80/20 (by weight) blend of DOWLEX™ 2045G/LDPE 611A. The polyethylene composition used in the sealant layer was varied, as provided subsequently in Table 9.

TABLE 9

| Sample | Sealant Layer |
|---|---|
| Comparative Film F | AFFINITY ™ PL 1880 G (Dow Chemical Co.) |
| Comparative Film G | AFFINITY ™ PF 1140 G (Dow Chemical Co.) |
| Comparative Film H | AFFINITY ™ VP 8770 G (Dow Chemical Co.) |
| Film 4 | Polyethylene Composition 1 (of Example 1) |
| Film 5 | Polyethylene Composition 2 (of Example 1) |

The blow-up ratio was set to 3.0. The output rate was 40 lb/hr, the distance between the nip rolls and die was 81 inches, the nip roll pressure was 0.5 MPa, the sealant extruder exit temperature was 230° C., the mandrel and exit die temperature was 230° C., and no internal bubble cooling was used.

About 20 feet of the collapsed bubble was collected by hand. Then 6 inches×1 inch strips were punched out of a collapsed bubble of films, with the longer dimension being along the machine direction. Approximately, one inch length of the two layers were separated by hand at one edge. The separated layers were clamped in the grips of an Instron frame (initial grip separation=1.5 inch) and pulled apart at the rate of 1 inch/min (180° peel). The test was continued until an additional 4 inches of the layers had been separated. The force-displacement curve was recorded during test. The force rapidly increased initially and then plateaued. The plateau force is measure of the blocking force. A few "spikes" in force may be observed as the layers were separated. The spikes may be due to improper cutting of the films leaving random points along the length of the specimen that were "stuck" together. To avoid falsely exaggerating the blocking force due to these spikes, the most frequent value of force in the plateau region (Mode) was taken as the measure of blocking instead of the average (Mean). At least five specimens were tested from each collapsed bubble. Results are reported in Table 10 as average±standard deviation of the blocking force measured from all the specimens.

TABLE 10

| Sample | Blocking Force (mN/inch) |
|---|---|
| Comparative Film F | 17.5 ± 1.7 |
| Comparative Film G | 32.9 ± 4.0 |
| Comparative Film H | 219.3 ± 23.8 |
| Film 4 | 31.9 ± 1.4 |
| Film 5 | 33.6 ± 4.8 |

The results of Table 10 show that Sample Films 4 and 5, which each include embodiments of the polyethylene compositions described herein, each show a blocking force comparable to Comparative Film G and less than Comparative Film H.

Example 6

In Example 6, the heat seal initiation temperature and hot tack initiation temperature was analyzed for monolayer films comprising the polyethylene compositions described herein.

To analyze these properties, monolayer films were coextruded on a LabTech 5-layer blown film line. Monolayer Film 1 was produced from Polyethylene Composition 1 of Example 1 previously described. Monolayer Film 2 was produced from Polyethylene Composition 2 of Example 1 previously described. Comparative Monolayer Film D was produced from Comparative Polyethylene Composition D (AFFINITY™ PL 1880G (Dow Chemical Co.)) of Example 2 previously described. Comparative Monolayer Film E was produced from Comparative Polyethylene Composition E (AFFINITY™ PF 1140G (Dow Chemical Co.)) of Example 2 previously described. This line was equipped with two 25 mm and three 20 mm single screw extruders of 30 L/D and a 75 mm die. Films with total thickness of 2 mils were made. The die gap was set at 78.7 mils, the blow-up ratio was 3.0, the melt temperature was 425° F.-445° F., the output rate was 25-30 lb/hr and the frost line height was 6-7 inches. The bubble of the monolayer film was slit in-line and separated into two rolls.

Hot tack measurements on the film were performed on each of Monolayer Films 1 and 2 and Comparative Monolayer Films D and E using an Enepay commercial testing machine according to ASTM F-1921 (Method B). Prior to testing the samples were conditioned for a minimum of 40 hrs at 23° C. and 50% R.H. per ASTM D-618 (Procedure A).

Sheets of dimensions 8.5" by 14" were cut from the film, with the longest dimension in the machine direction. Strips 1" wide and 14" long were cut from the sheets. Tests were performed on these samples over a range of temperatures and the results reported as the maximum load as a function of temperature. The temperature steps were 5° C. or 10° C. with 6 replicates performed at each temperature. The parameters used in the test were as follows: a Specimen Width of 25.4 mm (1.0 in); a Sealing Pressure of 0.275 $N/mm^2$; a Sealing Dwell Time of 0.5 s; a Delay time of 0.18 s; a Peel speed of 200 mm/s; and a Seal depth of 0.5 inch. A hot tack curve was created by linear interpolation of the average maximum load measured at each temperature. The minimum temperature at which an average maximum load of 2N was achieved (defined as hot tack initiation temperature) was determined from this curve, and is reported in Table 11.

Heat Seal measurements were performed on each of Monolayer Films 1 and 2 and Comparative Monolayer Films D and E using a commercial tensile testing machine according to ASTM F-88 (Technique A).

Prior to cutting, the films were conditioned for a minimum of 40 hrs at 23° C. (±2° C.) and 50% (±10%) R.H. per ASTM D-618 (procedure A). Sheets were then cut from the film in the machine direction to a length of approximately 11 inches and a width of approximately 8.5 inches. The sheets were heat sealed across the machine direction on a Kopp Heat Sealer over a range of temperatures under the following conditions: a Sealing Pressure of 0.275 $N/mm^2$; a Sealing Dwell Time of 1.0 s; and a Depth of seal of 5 mm. The sealed sheets were conditioned for a minimum of 3 hours at 23° (±2° C.) and 50% R.H (±10%) prior to cutting into one inch wide strips. The samples were conditioned for a minimum of 24 hours after sealing at 23° (±2° C.) and 50% R.H (±10%) prior to testing. For testing, the strips were loaded into the grips of a tensile testing machine at an initial separation of 2 inches and pulled at a grip separation rate of 10 inches/min at 23° (±2° C.) and 50% R.H (±10%). The strips were tested unsupported. Five replicate tests were performed for each sealing temperature. The maximum load measured during the peel is determined at multiple sealing temperatures, and a heat seal curve was created by linear interpolation of the average maximum load measured at each temperature. The temperature at which an average maximum load of 1 lb was achieved (defined as heat seal initiation temperature) was determined from this curve, and is provided subsequently in Table 11.

TABLE 11

| Sample | Hot Tack Initiation Temperature (° C.) | Heat Seal Initiation Temperature (° C.) |
|---|---|---|
| Comparative Monolayer Film D | 85 | 86 |
| Comparative Monolayer Film E | 70 | 73 |
| Monolayer Film 1 | 62 | 65 |
| Monolayer Film 2 | 61 | 65 |

As shown in Table 11, Monolayer Films 1 and 2 exhibited lower hot tack initiation temperatures and heat seal initiation temperatures than Comparative Monolayer Films D and E.

It will be apparent that modifications and variations are possible without departing from the scope of the disclosure defined in the appended claims. More specifically, although some aspects of the present disclosure are identified herein as preferred or exemplary or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A polyethylene composition comprising:

(a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile;

(b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and wherein the polyethylene composition has a density of 0.880 g/cm$^3$ to 0.910 g/cm$^3$, a melt index ($I_2$) of 0.50 g/10 minutes to 6.0 g/10 minutes, and a zero shear viscosity ratio of the polyethylene composition less than 2.0.

2. The polyethylene composition of claim 1, further comprising a fourth polyethylene fraction comprising at least one peak in a temperature range of from 20° C. to 35° C. in an elution profile via improved comonomer composition distribution (iCCD) analysis method, wherein a fourth polyethylene area fraction is an area in the elution profile from 20° C. to 35° C., and wherein the fourth polyethylene fraction area comprises from 0% to 35% of the total area of the elution profile.

3. The polyethylene composition of claim 1, wherein the first polyethylene fraction area comprises from 30% to 55% of the total area of the elution profile.

4. The polyethylene composition of claim 1, wherein the second polyethylene fraction area comprises from 20% to 45% of the total area of the elution profile.

5. The polyethylene composition of claim 1, wherein the third polyethylene fraction area comprises from 4% to 10% of the total area of the elution profile.

6. The polyethylene composition of claim 1, wherein the polyethylene composition has a molecular weight distribution, expressed as the ratio of the weight average molecular weight to number average molecular weight (Mw/Mn) in the range of from 2.0 to 6.0.

7. The polyethylene composition of claim 1, wherein a ratio of the molecular weight of the first polyethylene fraction to the molecular weight of the total area of the elution profile is from 0.5 to 1.5.

8. The polyethylene composition of claim 1, wherein the polyethylene composition has a tan delta, measured at 0.1 radian/sec and 190° C., from 10 to 100.

9. A multilayer film comprising, at least one layer comprising a polyethylene composition comprising:

(a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile;

(b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and wherein the polyethylene composition has a density of 0.880 g/cm$^3$ to 0.910 g/cm$^3$, a melt index ($I_2$) of 0.50 g/10 minutes to 6.0 g/10 minutes, and a zero shear viscosity ratio of the polyethylene composition less than 2.0.

10. The multilayer film of claim 9, wherein the at least one layer comprising a polyethylene composition is a sealant layer.

11. The multilayer film of claim 10, further comprising a substrate layer.

12. A method of producing an article comprising the steps of:

applying the polyethylene composition of claim 1 to at least one surface of a substrate layer, thereby forming an article comprising a sealant layer associated with the at least one surface of the substrate layer.

* * * * *